(12) United States Patent
Kashiyama et al.

(10) Patent No.: US 7,849,227 B2
(45) Date of Patent: Dec. 7, 2010

(54) STREAM DATA PROCESSING METHOD AND COMPUTER SYSTEMS

(75) Inventors: Toshihiko Kashiyama, Kokubunji (JP); Itaru Nishizawa, Koganei (JP); Tsuneyuki Imaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 12/230,289

(22) Filed: Aug. 27, 2008

(65) Prior Publication Data

US 2009/0271529 A1    Oct. 29, 2009

(30) Foreign Application Priority Data

Apr. 25, 2008    (JP)    ............... 2008-115765

(51) Int. Cl.
  *G06F 3/00*    (2006.01)
  *G06F 7/00*    (2006.01)
  *G06Q 10/00*    (2006.01)
(52) U.S. Cl. .................... 710/1; 707/705; 705/1.1
(58) Field of Classification Search ................ None
  See application file for complete search history.

(56) References Cited

U.S. PATENT DOCUMENTS 5,495,600 A    2/1996    Terry et al.

| | | | |
|---|---|---|---|
| 7,249,291 B2 * | 7/2007 | Rasmussen et al. | ......... 714/701 |
| 2006/0277230 A1 | 12/2006 | Nishizawa et al. | |
| 2006/0282695 A1 | 12/2006 | Mital et al. | |
| 2007/0022092 A1 | 1/2007 | Nishizawa et al. | |
| 2007/0288459 A1 | 12/2007 | Kashiyama et al. | |

OTHER PUBLICATIONS

Rajeev Motwani et al., "Query Processing, Resource Management and Approximation in a Data Stream Management System", In Proc. Of the 2003 Conference on Innovative Data Systems Research (CIDR), Jan. 2003; http://infolab.usc.edu/csci599/Fall_2002/paper/DS1_datastreammanagementsystem.pdf, 12 pages.
C.J. Date et al, "A Guide to SQL Standard (4$^{th}$ Edition)", "An Overview of SQL", Nov. 8, 1996, pp. 8-26.
Daniel J. Abadi et al., "The Design of the Borealis Stream Processing Engine", In Proc. of CIDR 2005, pp. 277-289.
U.S. Appl. No. 11/698,932, filed Jan. 29, 2007, Kashiyama et al.

(Continued)

*Primary Examiner*—Alan Chen
(74) *Attorney, Agent, or Firm*—Stites & Harbison PLLC; Juan Carlos A. Marquez, Esq.

(57) ABSTRACT

Provided is a stream data processing method that can effectively handle delay data. In the stream data processing method of processing data whose lifetime is defined by a window, an operation result excluding a delay tuple is immediately output along with an unconfirmed flag according to delay processing HBT while a midway processing result necessary for reproduction is retained along with the lifetime, and when the delay tuple arrives, a correct processing result is calculated from the delay tuple and the processing result restore tuple.

19 Claims, 35 Drawing Sheets

OTHER PUBLICATIONS

U.S. Appl. No. 12/078,520, filed Apr. 1, 2008, Moriwaki et al.
U.S. Appl. No. 12/035,094, filed Feb. 21, 2008, Tanaka et al.
Maskey et al., "Replay-Based Approaches to Revision Processing in Stream Query Engines", ACM, Mar. 29, 2008, SSPS vol. 301, pp. 3-12.

Ryvkina et al., "Revision Processing in a Stream Processing Engine: A High-Level Design", Data Engineering 2006, ICDE '06, Proceedings of the $22^{nd}$ International Conference on Data Engineering, Atlanta, GA, Apr. 3, 2006, pp. 1-3.

* cited by examiner

TEMPERATURE STREAM DATA (S1) 201₁

| APPLICATION TIMESTAMP | TEMPERATURE SENSOR ID | DEVICE ID | TEMPERATURE | SYSTEM TIMESTAMP | ... |
|---|---|---|---|---|---|
| 301 | 302 | 303 | 304 | 305 | 306 |

FIG. 3A

HUMIDITY STREAM DATA (S2) 201₂

| APPLICATION TIMESTAMP | HUMIDITY SENSOR ID | DEVICE ID | HUMIDITY | SYSTEM TIMESTAMP | ... |
|---|---|---|---|---|---|
| 311 | 312 | 313 | 314 | 315 | 316 |

FIG. 3B

STREAM REGISTRATION COMMAND  411 register stream temperature stream (temperature sensor ID int, device ID int, temperature double);

*FIG. 4*

STREAM DATA MANAGEMENT TABLE 224

| STREAM NAME | STREAM SCHEMA | REGISTRANT NAME | REGISTRATION DATE AND TIME |
|---|---|---|---|
| TEMPERATURE STREAM (S1) | (temperature sensor ID int, device ID int, temperature int) | KASHIYAMA | 2007/09/20 13:07:26 JST |
| HUMIDITY STREAM (S2) | (humidity sensor ID int, device ID int, humidity int) | KASHIYAMA | 2007/09/20 09:46:13 JST |
| S3 | ... | ... | ... |

*FIG. 5*

TEMPERATURE STREAM DATA (S1) 201₁

| APPLICATION TIMESTAMP | TEMPERATURE SENSOR ID | DEVICE ID | TEMPERATURE | |
|---|---|---|---|---|
| 9:00 | 1 | 1 | 20 | 501 |
| 9:00 | 2 | 1 | 24 | 502 |
| 9:00 | 3 | 2 | 28 | 503 |
| 9:00 | 4 | 2 | 32 | 504 |
| 9:00 | 5 | 2 | 16 | 505 |
| 9:01 | 1 | 1 | 21 | 506 |
| 9:01 | 2 | 1 | 25 | 507 |
| 9:01 | 3 | 2 | 29 | 508 |
| 9:01 | 4 | 2 | 33 | 509 |
| 9:01 | 5 | 2 | 17 | 510 |
| 9:02 | 1 | 1 | 22 | 511 |
| 9:02 | 2 | 1 | 26 | 512 |
| 9:02 | 3 | 2 | 30 | 513 |
| 9:02 | 4 | 2 | 34 | 514 |
| 9:02 | 5 | 2 | 18 | 515 |
| 9:03 | 1 | 1 | 23 | 516 |
| 9:03 | 2 | 1 | 27 | 517 |
| 9:03 | 3 | 2 | 31 | 518 |
| 9:03 | 4 | 2 | 35 | 519 |
| 9:03 | 5 | 2 | 19 | 520 |
| ... | ... | ... | ... | 521 |

521 ARRIVE AT 9:05
522 ARRIVE AT 9:05
523 ARRIVE AT 9:05

FIG. 6

QUERY REGISTRATION COMMAND 711 register query Q1 as
ISTREAM (SELECT S1.device ID, Avg(S1.temperature), Avg(S2.humidity)
FROM temperature stream [Partition by S1.temperature sensor ID rows 1] As S1,
humidity stream [Range 2 minute] As S2
WHERE S1.temperature sensor ID=S2.humidity sensor ID and S1.temperature>=20
and S2.humidity>=60 GROUP BY device ID);

FIG. 8

QUERY MANAGEMENT TABLE 224

| QUERY NAME /701 | QUERY /702 | QUERY EXECUTION FORMAT STORAGE DESTINATION /703 | REGISTRANT NAME /704 | REGISTRATION DATE AND TIME /705, /706 |
|---|---|---|---|---|
| Q1 | ISTREAM (SELECT S1.device ID, Avg(S1.temperature), Avg(S2.humidity) FROM temperature stream [Partition by S1.temperature sensor ID rows 1] as S1,humidity stream [Range 2 minute] as S2 WHERE S1.temperature sensor ID=S2.humidity sensor ID and S1.temperature>=20 and S2.humidity>=60 GROUP BY device ID); | 0x7FFFAEE1 | KASHIYAMA | 2007/09/20 13:07:26 JST |
| Q2 | ISTREAM (SELECT sensor ID, Min(temperature) FROM temperature stream [Range 2 minute] GROUP BY sensor ID HAVING Min(temperature)>20) | 0x7FFFA471 | KASHIYAMA | 2007/09/20 09:46:13 JST |
| Q3 | istream (select device ID, avg(temperature) from temperature stream [partition by sensor ID rows 1] group by device ID having avg(temperature)>20) | | | |
| Q4 | istream (select device ID, temperature, humidity from temperature stream [partition by sensor ID rows 1] as S1, humidity stream [range 2 minute] as S2 where S1.temperature>20 and S2.humidity>60 and S1.device ID=S2.device ID) | | | |
| ... | ... | ... | ... | ... |

FIG. 9

REAL-TIME OUTPUT RESULT

| APPLICATION TIMESTAMP | DEVICE ID | Avg (TEMPERATURE) | Avg (HUMIDITY) | CONFIRMED/ UNCONFIRMED FLAG |
|---|---|---|---|---|
| 9:00 | 1 | 22 | 62 | |
| 9:00 | 2 | 30 | 70 | |
| 9:01 | 1 | 23 | 62 | |
| 9:01 | 2 | 30.5 | 70 | UNCONFIRMED |
| 9:02 | 1 | 24 | 63 | |
| 9:02 | 2 | 31 | 71 | UNCONFIRMED |
| 9:03 | 1 | 25 | 63 | |
| 9:03 | 2 | 31.5 | 71 | UNCONFIRMED |
| ... | ... | ... | ... | |

Columns: 1201, 1202, 1203, 1204, 1205. Rows: 1206–1213.

FIG. 20

DELAY OUTPUT RESULT 251

| APPLICATION TIMESTAMP | DEVICE ID | Avg (TEMPERATURE) | Avg (HUMIDITY) | CONFIRMED/ UNCONFIRMED FLAG |
|---|---|---|---|---|
| 9:01 | 2 | 31 | 70 | CONFIRMED |
| 9:02 | 2 | 31 | 71 | CONFIRMED |
| 9:03 | 2 | 33 | 71 | CONFIRMED |
| ... | ... | ... | ... | |

NODE-STREAM MANAGEMENT TABLE 263

| NODE NAME | NODE IP ADDRESS | STREAM DATA NAME | TIMEOUT SETTING | CONSTANT INTERVAL TRANSMISSION | SCHEMA RESTRICTION CONDITION |
|---|---|---|---|---|---|
| Computer 0 | 192.168.0.100 | TEMPERATURE STREAM (S1) | – | 1 MINUTE | TEMPERATURE SENSOR ID=1, DEVICE ID =1 |
| Computer 1 | 192.168.0.101 | TEMPERATURE STREAM (S2) | 30 SECONDS | – | HUMIDITY SENSOR ID =1-2, DEVICE ID =1 |
| Computer 2 | 192.168.0.102 | TEMPERATURE STREAM (S1) | – | 1 MINUTE | TEMPERATURE SENSOR ID =2-3 |
|  |  | TEMPERATURE STREAM (S2) | 30 SECONDS | – | HUMIDITY SENSOR ID =3-5, DEVICE ID =2 |
| Computer 3 | 192.168.0.103 | S3 | 30 SECONDS | – | – |
| Computer 4 | 192.168.0.104 | TEMPERATURE STREAM (S1) | – | 1 MINUTE | TEMPERATURE SENSOR ID =4 |
| ... | ... | ... | ... | ... | ... |

Column labels: 1701, 1702, 1703, 1704, 1705, 1706

Row labels: 1707, 1708, 1709, 1710, 1711, 1712

MEMORY UPPER LIMIT SETTING SCREEN

MEMORY SIZE UPPER LIMIT VALUE SETTING COMMAND 1901 set RecalculationMaxMemorySize 300MB;

*FIG. 32*

STREAM DATA PROCESSING METHOD AND COMPUTER SYSTEMS

CLAIM OF PRIORITY

The present application claims priority from Japanese application P2008-115765 filed on Apr. 25, 2008, the content of which is hereby incorporated by reference into this application.

BACKGROUND OF THE INVENTION

This invention relates to a stream data processing method which is performed in a case where a portion of stream data arrives with a delay behind a time of generation thereof.

There has been an increasing demand for a data processing system which carries out real-time processing for data continuously arriving at a database management system (hereafter, referred to as "DBMS"), which carries out processes for data stored in the storage system. For example, in a system for trading stocks, how fast the system can react to changes in stock prices is one of the most important objects, and a method such as the one carried out by a conventional DBMS, in which stock data is once stored in a storage system, and then the stored data is searched for, cannot immediately respond in correspondence with the speed of the changes in stock prices, and may result in losing business chances. For example, though U.S. Pat. No. 5,495,600 discloses a mechanism which issues stored queries periodically, it is difficult to apply this mechanism to the real time data processing for which it is important to execute a query immediately after data such as stock prices is input.

Data which continuously arrives is defined as stream data, and there has been proposed a stream data processing system as a data processing system suitable for the real-time processing for the stream data. For example, R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), (online), January 2003, (retrieved on Oct. 12, 2006), Internet URL <http://infolab.usc.edu/csci599/Fall2002/paper/DS1_datastream managementsystem.pdf> discloses a stream data processing system "STREAM".

In the stream data processing system, first, queries are registered to the system, and the queries are executed continuously each time data arrives, which is different from the conventional DBMS. The above-mentioned STREAM employs an idea referred to as sliding window, which partially cuts stream data for efficiently processing the stream data to thereby impart lifetime to the data. As a preferred example of a query description language including a sliding window specification, there is a continuous query language (CQL) disclosed in R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), (online), January 2003, (retrieved on Oct. 12, 2006), Internet URL <http://infolab.usc.edu/csci599/Fall2002/paper/DS1_datastream managementsystem.pdf>. The CQL includes an extension for specifying the sliding window by using parentheses following a stream name in a FROM clause of a structured query language (SQL), which is widely used for the DBMS. As for SQL, there is known one disclosed in C. J. Date, Hugh Darwen: "A Guide to SQL Standard (4th Edition)", the United States, Addison-Wesley Professional, Nov. 8, 1996, ISBN: 0201964260. There are two types of typical methods for specifying the sliding window: (1) a method of specifying the number of data rows to be cut, and (2) a method of specifying a time interval containing data rows to be cut. For example, "Rows 50 Preceding" described in a second paragraph of R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), (online), January 2003, (retrieved on Oct. 12, 2006), Internet URL <http://infolab.usc.edu/csci599/Fall2002/paper/DS1_datastream managementsystem.pdf> is a preferred example of the item (1), in which data corresponding to 50 rows is cut to be processed, and "Range 15 Minutes Preceding" is a preferred example of the item (2), in which data for 15 minutes is cut to be processed. In the case of the item (1), the data lifetime is defined to be until 50 pieces of data arrive. In the case of the item (2), the data lifetime is defined to be 15 minutes. The stream data cut by the sliding window is retained on a memory, and is used for the query processing.

However, in the stream data, data sometimes arrives with a delay depending on a state of a network, a device, or the like. For example, a sensor node does not transmit data if the network is disconnected, and transmits the data collectively when a connection is again established with a base station.

As an example of known methods, D. J. Abadi, Y. Ahmad, M. Balazinska, U. Cetinternel, M. Cherniack, J. H. Hwang, W. Lindner, A. S. Makey, A. Rasin, E. Ryvkina, N. Tatbul, Y. Xing, and S. Zdonik, "The design of the Borealis stream processing engine", In Proc. of CIDR 2005, pp. 277-289 discloses a method of modifying/canceling data by retaining a history of input stream data for a predetermined period and executing the delay tuple again when a delay tuple arrives. During the predetermined period, which is set to a period longer than a lifetime defined by a window, all of the input stream data are stored. When the delay tuple arrives, the stored data and the delay tuple are executed again to thereby obtain a correct processing result. However, retaining all of the stream data for a predetermined period may cause an increase in memory size and time for performing execution again by using input data.

In addition, US 2006/0282695 discloses a method of implementing a transaction processing for recording latencies to solve a problem caused by a phenomenon in which an arrival order changes due to a communication delay. However, without a delay tuple, it is impossible to output a processing result in real time or recalculate a correct processing result.

The application of the stream data processing system is expected in fields in which the real time processing is required, and is typified by financial applications, traffic information systems, distribution systems, traceability systems, sensor monitoring systems, and computer system management.

SUMMARY OF THE INVENTION

The stream data processing requires immediacy of processing data. However, there is even a case where a portion of stream data arrives with a delay. In a case where there exists delayed data, the following two conventional methods are available:

(1) a method of processing data by controlling the data based on a time (system timestamp) at which the data arrives at the stream data processing system; and (2) a method of processing data by controlling the data based on a time (application timestamp) assigned to the data by a data source.

In a case of the method of the item (1), the system timestamp corresponds to a time at which data arrives with a delay, and hence the time assigned to the data by the data source is not reflected on the processing. This causes a problem that it is impossible to output a result that should be output if the data arrives without a delay. In a case of the method of the item (2), the processing cannot be started until a delay tuple arrives, which causes a problem that a processing result cannot be output in real time. Therefore, neither the methods of the items (1) nor (2) can be used.

In view of the above situation, even if there exists a delay tuple, it is required to output a processing result in real time by using an application timestamp. At that time, it is necessary to further indicate that the processing result has been output in a state where the delay tuple is included. Further, while the processing result is being output in real time, it is also necessary to recalculate the delay tuple at a time of its arrival and obtain a correct processing result. Without performing a recalculation or processing the delay tuple, there arises a problem that the correct processing result cannot be obtained, or that data that should be output originally cannot be output. Further, without processing the delay tuple, an internal state for an aggregation operation may become incorrect even after dissolution of the delay, and an output result after the dissolution of the delay may also become incorrect.

This invention has been made in view of the above-mentioned problems, and a first object of this invention is to output a processing result in real time by using an application timestamp even if there exists a delay tuple. Further, a second object of this invention is to recalculate the delay tuple at a time of its arrival and obtain a correct processing result.

According to this invention, there is provided a stream data processing method for causing a computer to execute a processing of receiving stream data input to the computer as primary information and of generating secondary information by acquiring primary information within a predetermined period from among the received primary information, comprising the steps of: receiving the stream data input to the computer as the primary information; determining whether or not the received primary information includes delay information indicating that there is primary information to arrive with a delay; and performing a first real-time processing when a result of the determination includes delay information, wherein: the step of performing the first real-time processing includes the steps of: extracting primary information corresponding to a predetermined lifetime from among the received primary information as secondary information, and generating a real-time processing result from the extracted secondary information; receiving primary information corresponding to the delay information; and recalculating the real-time processing result after receiving the primary information that arrives with a delay; the step of generating the real-time processing result from the extracted secondary information includes the steps of: obtaining secondary information based on the lifetime from primary information excluding primary information that is to arrive with a delay when the delay information is received, and outputting the secondary information as a real-time output result that needs to be recalculated; and retaining result restore information for obtaining the real-time output result as information that needs to be recalculated after receiving the primary information corresponding to the delay information, along with the lifetime; and the step of recalculating the real-time processing result after receiving the primary information that arrives with a delay includes the step of recalculating the secondary information from the primary information that arrives with a delay and the result restore information, and outputting a result of the recalculation as a delay output result.

By applying an exemplary embodiment of this invention, it is possible to realize a stream data processing in which the processing result is output in real time even if there is a delay in the stream data, and a correct processing result can be recalculated when the primary information (delay tuple) corresponding to the delay information arrives.

BRIEF DESCRIPTION OF THE DRAWINGS

FIG. 3A is a diagram schematically showing an example of the preferable data format of the stream data 201, representing the stream data on temperature.

FIG. 3B is a diagram schematically showing another example of the preferable data format of the stream data 201, representing the stream data on humidity.

FIG. 4 is an explanatory diagram showing a description example of a preferable command for causing the command input module 210 to register or set the stream data 201 in the stream data processing system 100.

FIG. 5 is a diagram showing an example of a structure of the stream data management table 222.

FIG. 6 is a diagram exemplifying the stream data 201 continuously input to the stream data processing system 100, representing the temperature stream data (S1) $201_1$.

FIG. 8 is an explanatory diagram showing a description example of a preferable command for causing the command input module 210 to register or set a query registration command in the stream data processing system.

FIG. 9 is a diagram showing an example of a structure of the query management table 224.

FIG. 20 is an explanatory diagram exemplifying the real-time output result 250 output by the query execution module 230.

FIG. 21 is an explanatory diagram exemplifying the delay output result 251 output by the query execution module 230.

FIG. 27 is a diagram showing an example of a structure of the node-stream management table 263.

FIG. 32 is an explanatory diagram showing a description example of a preferable command for causing the command input module 210 to set a memory size upper limit value for the result restore tuple area.

DETAILED DESCRIPTION OF THE PREFERRED EMBODIMENTS

First Embodiment

Hereinafter, description will be made of a first embodiment of this invention.

Figure 1:
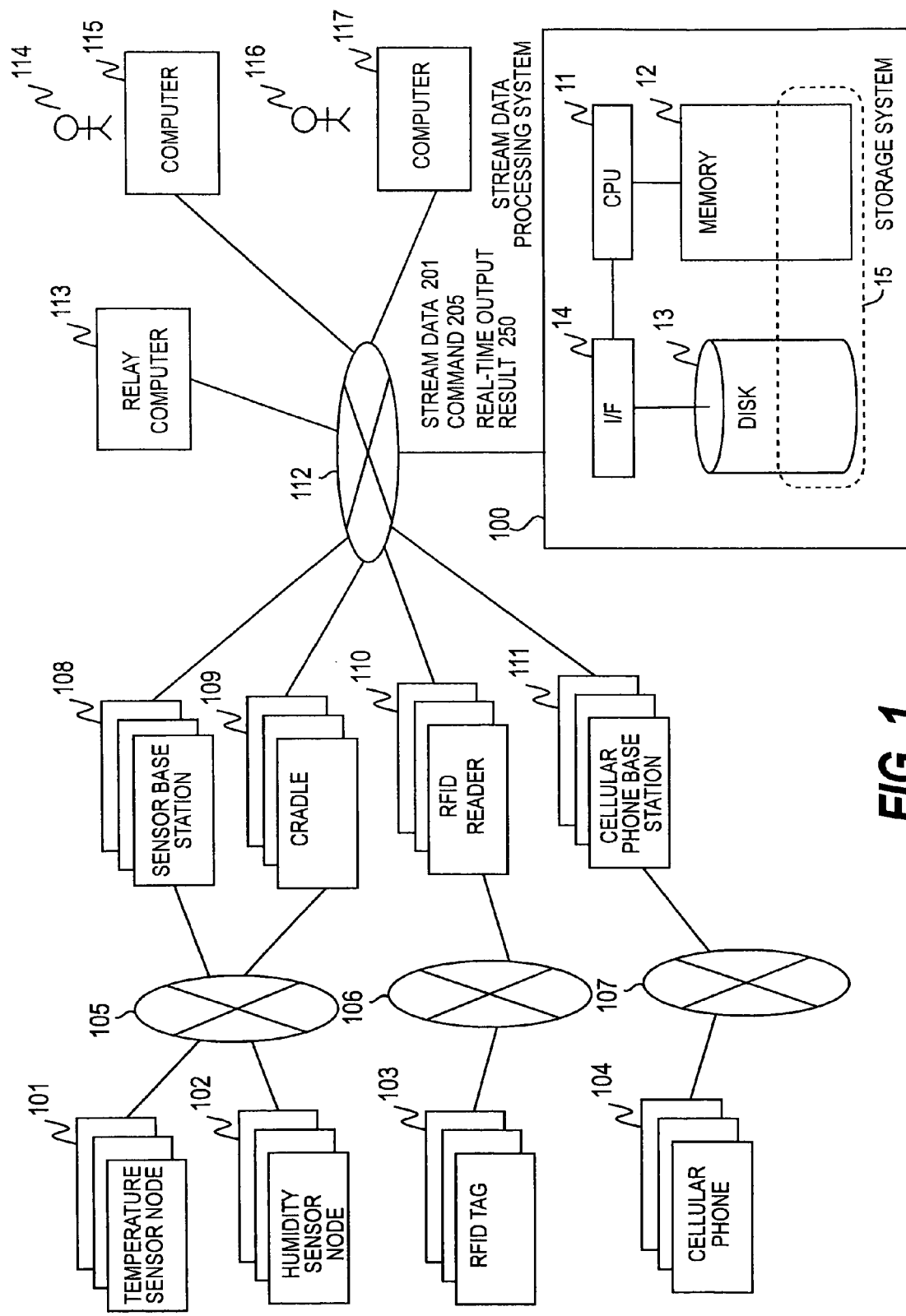
FIG. 1 shows a hardware configuration of a stream data processing system.

First, FIG. 1 shows a hardware configuration of a stream data processing system 100. FIG. 1 is a block diagram showing an example of the computer system according to a first embodiment of this invention. The stream data processing system 100 is executed on one computer, and includes a CPU 11 for performing an operation processing, a memory 12 for storing stream data 201 and a program for a stream data processing, a disk drive 13 for storing data, and an interface 14 for connecting the CPU 11 to the disk drive 13 and a network 112. It should be noted that the stream data processing system 100 may be executed on a plurality of computers. It should be noted that the program for a stream data processing may be stored on a recording medium such as a disk drive.

Sensor nodes such as a temperature sensor node 101 and a humidity sensor node 102 output data to be input to the stream data processing system 100 as the stream data 201, and are connected to a sensor base station 108 and a cradle 109 via a network 105. In addition, an RFID tag 103 is connected to a radio frequency identification (RFID) reader 110 via a network 106. In addition, a cellular phone 104 is connected to a cellular phone base station 111 via a network 107.

Connected to the network 112 are the sensor base station 108, the cradle 109, the RFID reader 110, the cellular phone base station 111, a relay computer 113 for executing an application such as sensor middleware or an RFID middleware, a computer 115 for inputting a command to the stream data processing system 100, and a computer 117 that uses a real-time output result 250 output from the stream data processing system 100.

The sensor base station 108 outputs measurement results (for example, temperature and humidity) from the temperature sensor node 101 and the humidity sensor node 102, respectively, and the RFID reader 110 outputs information read from the RFID tag 103. The cellular phone base station 111 outputs information received from the cellular phone 104. Those outputs are input to the stream data processing system 100 as the stream data 201.

The stream data 201 may be input to the stream data processing system 100 directly from the sensor base station 108, the cradle 109, the RFID reader 110, and the cellular phone base station 111 via the network 112, or after having been processed by the relay computer 113, the processed stream data 201 may be input to the stream data processing system 100.

Not only the stream data 201 but also delay processing heart beat tuple (hereinafter, referred to as "HBT") 202, a delay tuple 203, and a delay processing dissolution HBT 204, which will be described later in detail, are input to the stream data processing system 100.

In addition, a command 205 generated by the computer 115 that is operated by a user 114 is input to the stream data processing system 100 via the network 112.

The real-time output result 250 that is a result processed by the stream data processing system 100 is output to the computer 117 that is operated by a user 116 via the network 112. Although described later in detail, not only the real-time output result 250 but also a delay output result 251 is output to the computer 117.

In this case, the stream data processing system 100, the relay computer 113, the computer 115, and the computer 117 are configured by an arbitrary computer system including a personal computer and a workstation, and may be the same computer or different computers. Further, the user 114 and the user 116 may be the same user or different users. Further, the networks 105, 106, 107, and 112 may be one of: a local area network (LAN) based on a connection by an Ethernet (registered trademark), an optical fiber, a fiber distributed data interface (FDDI), a radio, or the like; a wide area network (WAN) including an Internet lower in speed than the LAN; a public telephone network; and a similar technology which will be invented in the future.

Here, a storage system 15 shown in FIG. 1 includes a predetermined area of the memory 12 and a predetermined area of the disk drive 13. The stream data 201 is stored in the storage system 15 mainly within the memory 12, which allows a high speed search in response to a query sent from the computers 115 and 117. The stream data processing system 100 that manages the continuously-changing stream data 201 stores the stream data 201 to be a search target in the storage system 15 within the memory 12, and the stream data 201 that is no longer needed for the purpose of the high speed search can be stored in the storage system 15 within the disk drive 13. For example, in a case where the stream data 201 represents a measurement value (such as a temperature) output from the temperature sensor node 101, the measurement value to be monitored by the computer 115 according to an intention of the user 114 may be a today's value, and hence there arises no problem even if a value obtained on a previous day cannot be searched for at high speed. Therefore, the stream data processing system 100 can store the today's measurement value in the storage system 15 within the memory 12, the measurement value obtained on a previous day within the disk drive 13 as an archive. Here, the storage system 15 may be any recording medium such as a memory, a disk, a tape, and a flash memory. Further, the storage system 15 may have a hierarchical structure including a plurality of recording media. Further, the storage system 15 may be realized by a similar technology which will be invented in the future.

It should be noted that FIG. 1 shows an example of a sensor monitoring system for processing information output from a sensor, an RFID, and a cellular phone, but the stream data processing system 100 can also be applied to a system represented by a financial application, a traffic information system, a distribution system, a traceability system, and computer system management.

For example, in a case of the financial application for handling stocks, a stock price distribution server (not shown) for distributing stock prices and trading volumes is connected to the network 105, a news distribution server (not shown) for distributing news is connected to the network 106, and an Internet-based transaction server (not shown) for processing Internet transactions and a brick-and-mortar-based transaction server (not shown) for processing brick-and-mortar-based transactions are connected to the network 107. Further, the relay computer 113 may serve as a server connected to the networks 105, 106, 107, and 112, for converting information transmitted from the stock price distribution server, the news distribution server, the Internet-based transaction server, and the brick-and-mortar-based transaction server into a format that can be processed by the stream data processing system 100. In this embodiment, for example, even in a case where information is transmitted from a certain store with a delay, the processing can be continued in the stream data processing system 100.

Figure 2:
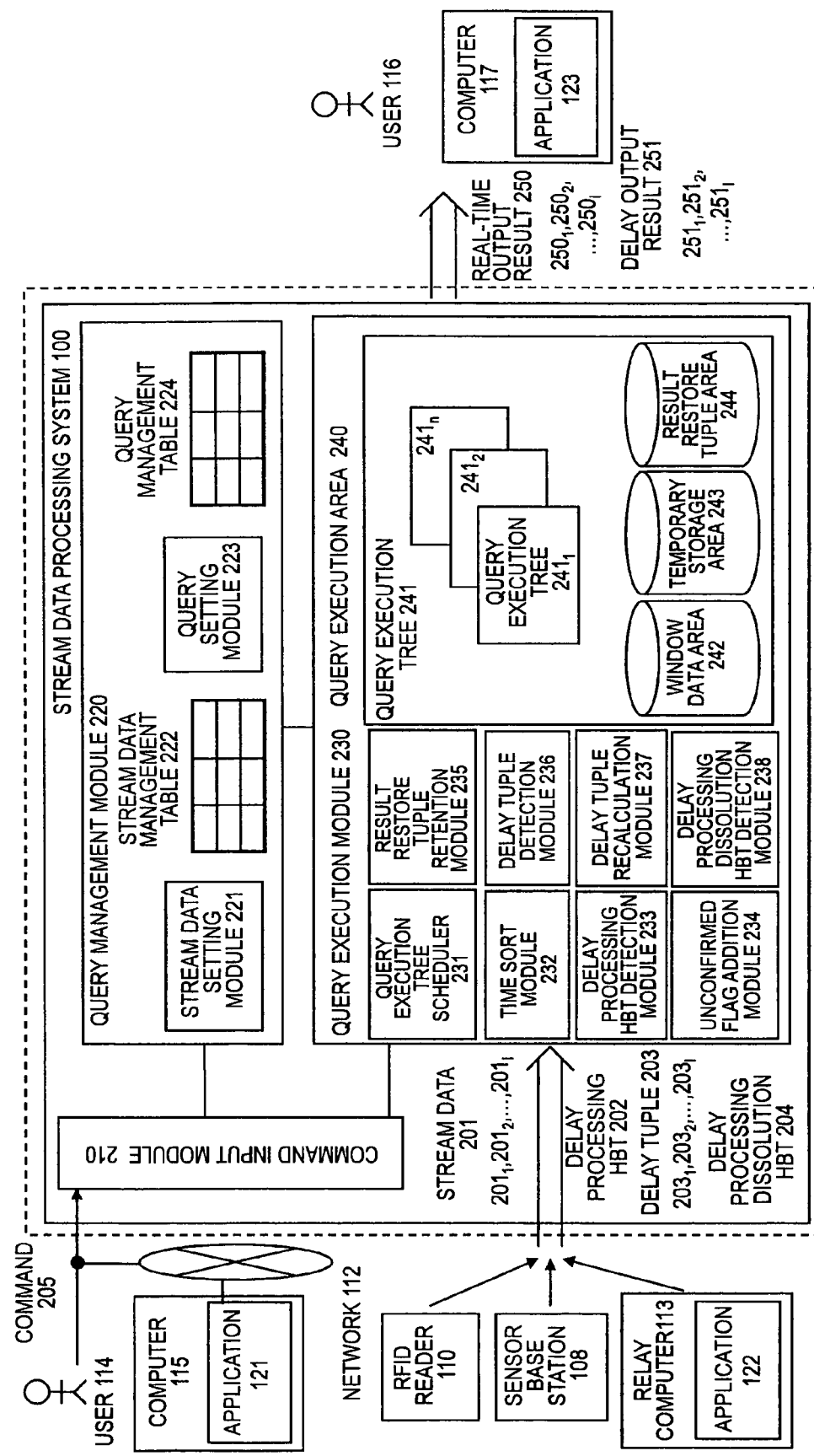
FIG. 2 is a block diagram showing a configuration of the stream data processing system to which an embodiment of this invention is applied and the system components related thereto.

FIG. 2 is a block diagram showing a configuration of the stream data processing system 100 to which an embodiment of this invention is applied and the system components related thereto.

In FIG. 2, the stream data processing system 100 receives an input of information, which is transmitted in real time from the sensor base station 108, the RFID reader 110, or an application 122 running on the relay computer 113, as the stream data 201. Based on the command 205 input by an application 121 running on the computer 115 that is operated by the user 114, the stream data processing system 100 converts the input stream data 201 into significant information, and generates the output result 250. The stream data processing system 100 represents a computer (or a server) for executing a processing on stream data to be provided to an application 123 running on the computer 117 that is operated by the user 116. The stream data 201 includes a plurality of stream data $201_1$, $201_2$, ..., $201_n$.

The computer 115 is connected to the stream data processing system 100 via a network 112. Moreover, the applications 121, 122, and 123 may be the same application or different applications.

In this case, the stream data 201 processed in this embodiment is different from a stream used to distribute video or audio, and one stream data corresponds to significant information. Moreover, the stream data 201 received from the sensor base station 108, the RFID reader 110, or the application 122 running on the relay computer 113 by the stream data processing system 100 is continuous or intermittent, and the respective stream data 201 include different information and different items.

The stream data processing system 100 includes a command input module 210, a query management module 220, and a query execution module 230.

The command input module 210 receives the command 205 input by the application 121 running on the computer 115 that is operated by the user 114. Subsequently, the query management module 220 manages as a "query" a content of a processing for converting information on the stream data 201 into significant information from the command received by the command input module 210. Then, the query execution module 230 converts, based on the "query" which has been received by the command input module 210 and managed by the query management module 220, the information on the stream data 201 into significant information (information that can be understood by the user 114), and outputs the significant data.

Referring to FIG. 2, description will be made of an outline of this invention. In the stream data processing system 100, based on the query 205 input by the application 121 running on the computer 115 that is operated by the user 114, the query execution module 230 reads the stream data 201, converts the information on the stream data 201 into significant information, and then outputs the real-time output result 250 to the computer 115. Here, the term "significant information" represents, for example, information obtained by converting the measurement value output from the temperature sensor node 101 shown in FIG. 1, which would not be understood by the user 114 or 116 if remaining being a binary value, into a value to which a predetermined system of units is added.

Further, if the stream data 201 arrives with a delay, the stream data processing system 100 receives the delay processing HBT 202 from the sensor base station 108, the RFID reader 110, or the application 122 running on the relay computer 113.

For example, in a case where data that has been measured by the temperature sensor node 101 at predetermined intervals is to be transmitted as the stream data 201, if the stream data 201 has not been received from the temperature sensor node 101 even within the predetermined interval, the sensor base station 108 transmits the delay processing HBT 202 representing a heart beat of the temperature sensor node 101 to the stream data processing system 100. It should be noted that the sensor base station 108 transmits the delay processing HBT 202 in a form of being included in the stream data 201.

The delay processing HBT 202 serves as dummy data for causing the stream data processing system 100 to continue the processing, for example, a tuple containing an ID, an application timestamp, and the like of the temperature sensor node 101. It should be noted that when performing operation settings on the temperature sensor node 101, the sensor base station 108 receives a measurement interval (or an activation interval) from the computer 115, and instructs the temperature sensor node 101 to that effect. At this time, the sensor base station 108 stores the measurement interval along with the ID of the temperature sensor node 101.

When there occurs a delay in the transmission of the stream data 201, the sensor base station 108 transmits the delay processing HBT 202 to the stream data processing system 100, and waits for the stream data 201 to be sent from the temperature sensor node 101. The sensor base station 108 manages whether or not the stream data 201 received from the temperature sensor node 101 is the delay tuple 203. Upon reception of the stream data 201 that has arrived with a delay, the sensor base station 108 forwards the stream data 201 to the stream data processing system 100 as the delay tuple 203.

When all of delay tuples 203 have arrived, the sensor base station 108 transmits the delay processing dissolution HBT 204 to the stream data processing system 100. The delay processing dissolution HBT 204 represents dummy data indicating that there is no more delay tuple 203, and is transmitted in the form of being included in the stream data 201. It should be noted that the sensor base station 108 transmits the delay processing HBT 202 to the stream data processing system 100 if the stream data 201 has not been received from the temperature sensor node 101 within the measurement interval, and if the measurement interval is regained upon reception of the stream data 201 from the temperature sensor node 101 within the measurement interval, transmits the delay processing dissolution HBT 204 to the stream data processing system 100.

It should be noted that the above description shows the example where the delay processing HBT 202, the delay tuple 203, and the delay processing dissolution HBT 204 are transmitted to the stream data processing system 100 with respect to the temperature sensor node 101 and the sensor base station 108, but the RFID reader 110 and the application 122 running on the relay computer 113 each perform the processing in a manner similar to the sensor base station 108.

The stream data processing system 100 is configured to first receive the delay processing HBT 202, then receive the delay tuple 203 as actual data, in other words, the stream data 201, and after receiving all of the delay tuples 203, receive the delay processing dissolution HBT 204.

Upon reception of the delay processing HBT 202, the query execution module 230 of the stream data processing system 100 executes a query without data arriving with a delay, and outputs the real-time output result 250. In other words, in a case where the delay processing HBT 202 has been received and the delay processing dissolution HBT 204 has not been received when a command (processing request) to request for the stream data 201 within a given range is received from the computer 117, the query execution module 230 processes the query by using only the stream data 201 that has been already received. Further, upon reception of the delay tuple 203, the query execution module 230 outputs a query execution result that should have been output if the stream data 201 had arrived without a delay, to the computer 117 as the delay output result 251. This enables the stream data processing for outputting in real time the processing result (real-time output result 250) even if the delay tuple 203 has not arrived yet, and allowing a recalculation of a correct processing result after the delay tuple 203 arrives.

Hereinafter, detailed description will be made of the configuration of the stream data processing system 100.

The command input module 210 includes an interface (hereinafter, referred to as "I/F") for receiving the command 205 input from the application 121 running on the computer 115 that is operated by the user 114. If the command is a command related to the stream data 201 or the query, the command input module 210 outputs contents of the command to the query management module 220.

The query management module 220 includes a stream data setting module 221, a stream data management table 222, a query setting module 223, and a query management table 224. The stream data setting module 221 receives a stream data registration/change command representing a command for registering or changing the stream data input from the command input module 210, and updates the stream data management table 222. The stream data management table 222 is a table for retaining information set by the stream data setting module 221 in such a manner as described later.

The query setting module 223 receives a query registration/change command representing a command for registering or changing the query input from the command input module 210, and updates the query management table 224. Further, the query setting module 223 generates or changes a query execution tree 241 representing a processing content for the stream data 201 corresponding to the query command. It should be noted that the query setting module 223 transmits the generated query execution tree 241 to the query execution module 230, and causes the query execution module 230 to store the query execution tree 241 into a query execution area 240. The query management table 224 is a table for retaining information set by the query setting module 223 in such a manner as described later.

The query execution module 230 includes a query execution tree scheduler 231, a time sort module 232, a delay processing HBT detection module 233, an unconfirmed flag addition module 234, a result restore tuple retention module 235, a delay tuple detection module 236, a delay tuple recalculation module 237, a delay processing dissolution HBT detection module 238, and the query execution area 240.

The query execution area 240 includes the query execution tree 241, a window data area 242, a temporary storage area 243, and a result restore tuple area 244, and the query execution tree 241 includes a plurality of query execution trees $241_1, 241_2, \ldots,$ and $241_n$.

The query execution tree 241 represents a content of the stream data 201 to be processed, and has a tree structure of processing modules for a window operation, a selection operation, a projection operation, a join operation, and an aggregation operation. The query execution tree 241 is generated by the query setting module 223. The window data area 242 is an area for retaining the stream data 201 cut out by the window operation. The temporary storage area 243 is a temporary data storage area used for performing the join operation, the aggregation operation, and the like.

The query execution tree scheduler 231 controls an execution sequence of the query execution tree 241. The time sort module 232 sorts the stream data 201 in an application timestamp order, and inputs the stream data 201 to the query execution area 240. It should be noted that the application timestamp represents a time assigned to the stream data 201 at the temperature sensor node 101, the humidity sensor node 102, the cellular phone 104, the RFID reader 110, the sensor base station 108, or the like.

The delay processing HBT detection module 233 detects a case where the delay processing HBT 202 is contained in the stream data 201 that has been input.

Upon reception of the delay processing HBT 202, with respect to all of results from executing a query without the stream data 201 arriving with a delay or the stream data 201 that may not be operated correctly due to the stream data 201 arriving with the delay, the unconfirmed flag addition module 234 adds an unconfirmed flag indicating that the processing result is unconfirmed and may be recalculated later, while adding a confirmed flag indicating that the processing result is confirmed by the recalculation based on the delay tuple 203 that has arrived with a delay.

The result restore tuple retention module 235 stores into the result restore tuple area 244, which will be described later, a tuple that is necessary to recalculate a correct operation result from the delay tuple 203 and data stored in the result restore tuple area 244 when the delay tuple 203 arrives.

The delay tuple detection module 236 detects a case where the delay tuple 203 is contained in the stream data 201. When the delay tuple 203 arrives, the delay tuple recalculation module 237 recalculates the correct operation result from the delay tuple 203 and data stored in the result restore tuple area 244. The delay processing dissolution HBT detection module 238 detects a case where the delay processing dissolution HBT 204 is contained in the stream data 201 that has been input.

Here, the stream data 201, the delay processing HBT 202, the delay tuple 203, the delay processing dissolution HBT 204, the real-time output result 250, and the delay output result 251 may be of any data format selected from the group consisting of a tuple format (record format), an XML format, and a CSV file. The following description will be made of an example where a tuple format is used therefor. In a similar manner, data retained in the window data area 242, the temporary storage area 243, and the result restore tuple area 244 may be of any data format selected from the group consisting of a tuple format (record format), an XML format, and a CSV file. The following description will be made of an example where the tuple format is used therefor.

Further, the stream data 201, the delay processing HBT 202, the delay tuple 203, the delay processing dissolution HBT 204, the real-time output result 250, and the delay output result 251 do not always need to contain a data entity, and may include a pointer that indicates an entity of partial data or entire data. In a similar manner, the data retained in the window data area 242, the temporary storage area 243, and the result restore tuple area 244 does not always need to contain the data entity, and may include the pointer that indicates the entity of partial data or entire data.

If the stream data 201 is provided by the RFID reader 110, the sensor base station 108, and the relay computer 113 with a guarantee that the application timestamps are subjected to a time sort, the time sort module 232 may be excluded from the system. Alternatively, the time sort module 232 may be realized by an equivalent function by implementing in the query execution tree 241 a query performing a union operation on the stream data 201.

FIGS. 3A and 3B are diagrams schematically showing examples of a preferable data format of the stream data 201. FIG. 3A is a diagram schematically showing an example of the preferable data format of the stream data 201, representing the stream data on temperature. FIG. 3B is a diagram schematically showing another example of the preferable data format of the stream data 201, representing the stream data on humidity. The example of FIG. 3A shows temperature stream data (S1) $201_1$, which is output from the temperature sensor node 101, while the example of FIG. 3B shows humidity stream data (S2) $201_2$, which is output from the humidity sensor node 102.

The temperature stream data (S1) $201_1$ of FIG. 3A is of a record format, and an application timestamp column 301, a temperature sensor ID column 302, a device ID column 303, a temperature column 304, and a system timestamp column 305, which constitute a record, correspond to a segment. A combination of the application timestamp column 301, the temperature sensor ID column 302, the device ID column 303, the temperature column 304, and the system timestamp column 305 is referred to as a tuple 306.

Here, a value of the application timestamp column 301 represents time information assigned to the temperature stream data (S1) $201_1$ before being input to the stream data processing system 100, and the assignment is performed by the temperature sensor node 101, the sensor base station 108, or an application such as sensor middleware running on the relay computer 113. Further, a value of the system timestamp column 305 represents time information assigned by the stream data processing system 100 to the temperature stream data (S1) $201_1$ when being input to the stream data processing system 100, the time information indicating when the temperature stream data (S1) $201_1$ arrives at the stream data processing system 100.

It should be noted that the value may be retained only in one of or in both of the application timestamp column 301 and the system timestamp column 305. In the following example, the tuple 306 has the value retained only in the application timestamp column 301, and has an arrival time set as necessary in the system timestamp column 305.

The humidity stream data (S2) $201_2$ of FIG. 3B is of another record format, and an application timestamp column 311, a humidity sensor ID column 312, a device ID column 313, a humidity column 314, and a system timestamp column 315, which constitute a record, correspond to a segment. A combination of the application timestamp column 311, the humidity sensor ID column 312, the device ID column 313, the humidity column 314, and the system timestamp column 315 is referred to as a tuple 316.

Here, a value of the application timestamp column 311 represents time information assigned to the humidity stream data (S2) $201_2$ before being input to the stream data processing system 100, and the assignment is performed by the humidity sensor node 102, the sensor base station 108, or an application such as sensor middleware running on the relay computer 113. Further, a value of the system timestamp column 315 represents time information assigned by the stream data processing system 100 to the humidity stream data (S2) $201_2$ when being input to the stream data processing system 100, the time information indicating when the humidity stream data (S2) $201_2$ arrives at the stream data processing system 100.

It should be noted that the value may be retained only in one of or in both of the application timestamp column 311 and the system timestamp column 315. In the following example, the tuple 316 has the value retained only in the application timestamp column 311, and has an arrival time set as necessary in the system timestamp column 315.

FIG. 4 is an explanatory diagram showing a description example of a preferable command for causing the command input module 210 to register or set the stream data 201 in the stream data processing system 100.

A stream registration command 411 is input from the application 121 running on the client computer 115 that is operated by the user 114 to the command input module 210, and registered in the stream data setting module 221. The stream registration command 411 represents a command for registering stream data that is the temperature stream data (S1) $201_1$ constituted of a temperature sensor ID retaining an integer type (int type), a device ID retaining an integer type (int type), and a temperature retaining a floating point type (double type), which correspond to the temperature sensor ID column 302, the device ID column 303, and the temperature column 304, respectively, shown in FIGS. 3A and 3B.

In this embodiment, the application timestamp column 301 is automatically included, but the stream registration command 411 may be specified explicitly as "register stream temperature stream (application timestamp timestamp, temperature sensor ID int, device ID int, temperature double);". The system timestamp column 305 can also be handled in a manner similar to the application timestamp column 301.

This embodiment has been described by taking an example where a command is registered in a command line interface (CLI) format, but there is no limitation thereto. For example, a graphical user interface (GUI) may be used to perform an input having the same meaning as described above. The same holds true of the following commands.

FIG. 5 is a diagram showing an example of a structure of the stream data management table 222.

Stored in a stream name column 401 and a stream schema column 402 are a name of the stream data 201 registered in the command input module 210 and a registered stream schema, respectively.

Stored in a registrant name column 403 and a registration date and time column 404 are a name of a registrant who has executed the stream registration command acquired at a time of stream registration and a registration date and time, respectively, which are used for the access management and security management for the stream data processing system 100.

For example, a row 405 shows a case where the stream registration command 411 shown in FIG. 4 is registered in the stream data management table 222.

The row 405 indicates that the stream name column 401 has a value of "temperature stream (S1)", the stream schema column 402 has a value of "temperature sensor ID int, device ID int, temperature int", the registrant name column 403 has a value of "Kashiyama", and the registration date and time column 404 has a value of "2007/09/20 13:07:26 JST".

Here, the I/F for inputting the stream data registration/setting may be not only of a command format shown in FIG. 4 and a table format shown in FIG. 5 but also of any format selected from the group consisting of a parameter input through a graphical user interface (GUI), an input through a setting file, and an input through an XML file. The same holds true of the following tables.

FIG. 6 is a diagram exemplifying the stream data 201 continuously input to the stream data processing system 100, representing the temperature stream data (S1) $201_1$.

In the temperature stream data $201_1$, one row of the table corresponds to the tuple 306 shown in FIG. 3A, and is constituted of the application timestamp column 301 indicating a data generation time of each tuple, the temperature sensor ID column 302, the device ID column 303, and the temperature column 304.

For example, a row 501 represents a tuple with the application timestamp column 301 set to a value of "9:00", the temperature sensor ID column 302 set to a value of "1", the device ID column 303 set to a value of "1", and the temperature column 304 set to a value of "20 (20.0)".

Assumed in the following description is a case where the delay tuple is generated. In this case, tuples 509, 514, and 519 do not arrive at times indicated in the application timestamp column 301, and collectively arrive with a delay at 9:05. In the following description, the tuples 521 to 523 arriving with a delay will be referred to as the delay tuples 203.

Though, according to this embodiment, the time stamp has a format including a time and a minute such as "9:00", the time stamp may have other format such as one typified by a format additionally including a date and a second such as "2007/9/21 9:00:00 JST". The same holds true in the following drawings.

Figure 7:
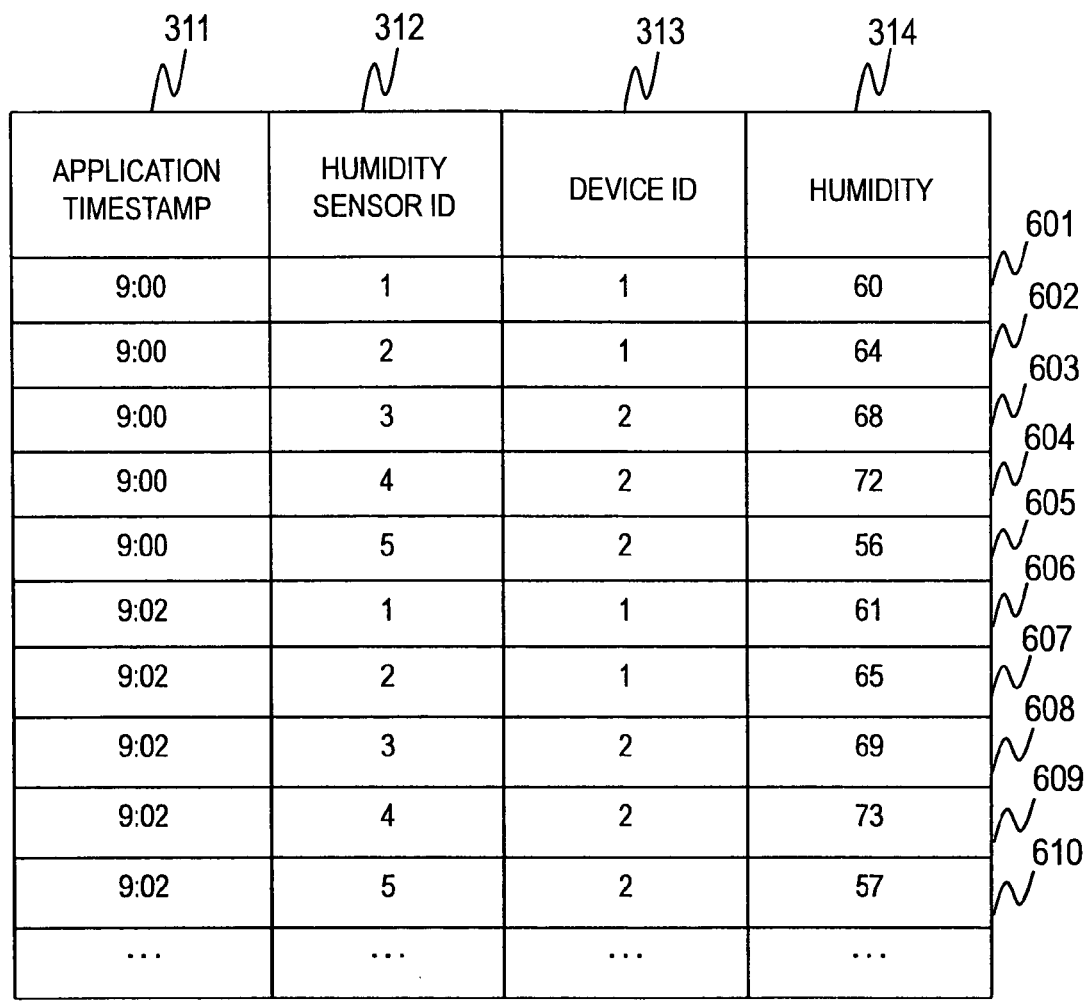
FIG. 7 is a diagram exemplifying the stream data 201 continuously input to the stream data processing system 100, representing the humidity stream data (S2) $201_2$.

FIG. 7 is a diagram exemplifying the stream data 201 continuously input to the stream data processing system 100, representing the humidity stream data (S2) $201_2$.

In the humidity stream data $201_2$, one row of the table corresponds to the tuple 316, and is constituted of the application timestamp column 311 indicating a data generation time of each tuple, the humidity sensor ID column 312, the device ID column 313, and the humidity column 314.

For example, a row 601 represents a tuple with the application timestamp column 311 set to a value of "9:00", the humidity sensor ID column 312 set to a value of "1", the device ID column 313 set to a value of "1", and the humidity column 314 set to a value of "60 (60.0)".

FIG. 8 is an explanatory diagram showing a description example of a preferable command for causing the command input module 210 to register or set a query registration command in the stream data processing system 100.

A query registration command 711 is registered in the query setting module 223 by the user 114 or the application 121 running on the client computer 115 through the command input module 210.

The query registration command 711 represents a query indicating a processing of: selecting one latest tuple of the temperature stream data (S1) $201_1$ on a temperature sensor ID basis ([Partition by S1.temperature sensor ID rows 1]) and a tuple of the humidity stream data $201_2$ within a range of past two minutes ([Range 2 minute]); joining a tuple of the temperature stream data (S1) $201_1$ with a tuple of the humidity stream data (S2) $201_2$ in a case where a condition that the temperature of the temperature stream data (S1) $201_1$ is 20° C. or higher (S1.temperature>=20) and a condition that the humidity of the humidity stream data (S2) $201_2$ is 60% or higher (S2.humidity>=60) are satisfied, and where the temperature sensor ID of the temperature stream data (S1) $201_1$ matches the humidity sensor ID of the humidity stream data (S2) $201_2$ (WHERE S1.temperature sensor ID=S2.humidity sensor ID); calculating an average value of the temperature (Avg(S1 temperature)) and an average value of the humidity (Avg(S2.humidity)) on a device ID basis (GROUP BY device ID); converting only a tuple that includes the temperature sensor ID, the average value of the temperature, and the average value of the humidity and exhibits an increase into a stream (ISTREAM); and outputting the stream.

FIG. 9 is a diagram showing an example of a structure of the query management table 224.

Stored in a query name column 701 and a query column 702 are a name of the query registered in the command input module 210 and the registered query, respectively.

Stored in a query execution format storage destination column 703 is an address of (pointer to) a location where an execution format of the query is stored. By previously creating the execution format, it is possible to cut such overhead that compiling is performed each time the query is executed. The address indicates, for example, a storage location within the memory 12 shown in FIG. 1.

Stored in a registrant name column 704 and a registration date and time column 705 are a name of the registrant of the query acquired when the query registration command is executed and the registration date and time of the query, respectively, which are used for the access management and security management for the stream data processing system 100.

For example, a row 706 shows a case where the query registration command 711 shown in FIG. 8 is registered in the query management table 224.

The row 706 indicates that the query name column 701 has a value of "Q1", the query column 702 has a value of "ISTREAM (SELECT S1.device ID, Avg(S1.temperature), Avg(S2.humidity) FROM temperature stream [Partition by S1.temperature sensor ID rows 1] As S1, humidity stream [Range 2 minute] As S2 WHERE S1.temperature sensor ID=S2.humidity sensor ID and S1.temperature>=20 and S2.humidity>=60 GROUP BY device ID);", the query execution format storage destination column 703 has a value of "0x7FFFAEE1", the registrant name column 704 has a value of "Kashiyama", and the registration date and time column 705 has a value of "2007/09/20 13:07:26 JST".

Figure 10:
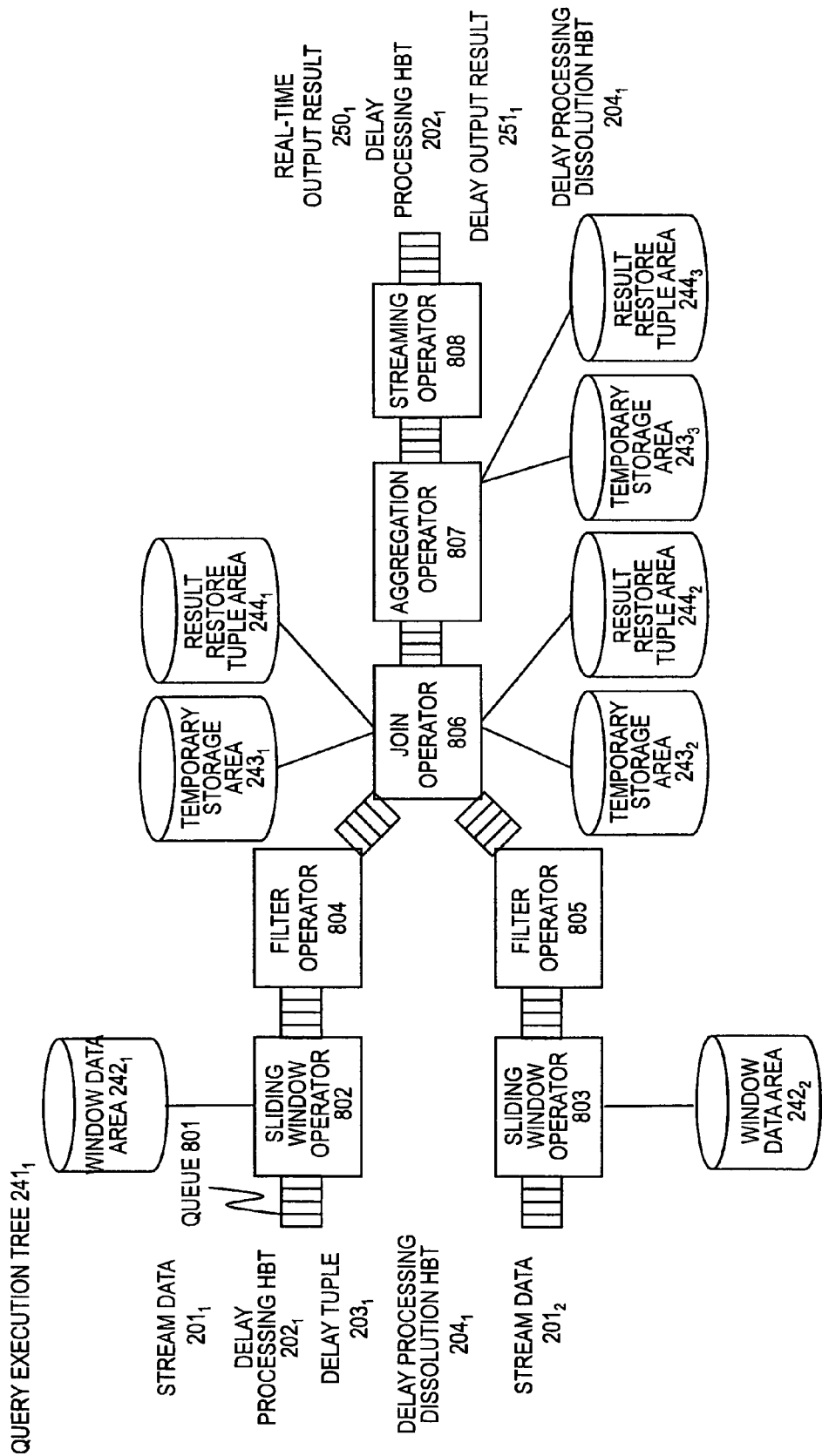
FIG. 10 is an explanatory diagram showing an example of the query execution tree 241 of the query execution area 240.

FIG. 10 is an explanatory diagram showing an example of the query execution tree 241 of the query execution area 240.

The query execution tree 241 represents the query execution tree 241 generated by the query setting module 223 shown in FIG. 2 when the query registration command 711 shown in FIG. 8 is executed. The query execution tree 241 is constituted of operators each serving as an execution module for performing a processing and queues 801 connecting the operators with each other.

In FIG. 10, the left end indicates an input side, and the right end indicates an output side. As an input tuple, the stream data 201 is input. If there is a delay tuple, the delay processing HBT 202 and the delay tuple 203 are also input. The processing result of the query of the query execution tree 241 is output as the real-time output result 250. If there is a delay tuple, the delay output result 251 is also output. The real-time output result 250, the delay processing HBT 202, and the delay output result 251 can be input again for another input as the stream data 201, the delay processing HBT 202, and the delay tuple 203, respectively.

The operators vary in type depending on their processing contents. Row window operators 802 and 803 cut out data rows from the stream data 201 by specifying the number of data rows or a time interval for cutting out data rows, and perform a processing of converting the stream data 201 into a tuple set.

The data rows cut out by the row window operators 802 and 803 are retained in the window data areas $242_1$ and $242_2$, respectively. Filter operators 804 and 805 perform a processing of determining whether or not the tuples 306 and 316 shown in FIGS. 3A and 3B, respectively, are output based on predetermined conditions. A join operator 806 performs a processing of joining two or more stream data 201 under a given condition. An aggregation operator 807 performs an aggregation processing represented by derivation of a sum, an average, a maximum, a minimum, a count, a variance, a standard deviation, a median, or the like. A streaming operator 808 performs a processing of converting the tuple set into the stream data 201. In addition to the operators shown in FIG. 10, there are a projection operator for performing a processing of outputting only a portion of the columns of the delay tuple 203 and other such operators.

FIG. 10 shows the query execution tree 241 generated by the query setting module 223 shown in FIG. 2 when the query registration command 711 shown in FIG. 8 is executed. The query execution tree $241_1$ receives inputs of the temperature stream data $201_1$ and the humidity stream data $201_2$. The row window operator 802 retains the one latest tuple of the temperature stream data $201_1$ on a temperature sensor ID basis ([Partition by S1.temperature sensor ID rows 1]) in the window data area $242_1$, and outputs to the filter operator 804 a tuple that has newly entered a window and a tuple that is about to leave the window.

The row window operator 803 retains the tuple of the humidity stream data $201_2$ within the range of past two minutes ([Range 2 minute]) in the window data area $242_2$, and outputs to the filter operator 805 a tuple that has newly entered a window and a tuple that is about to leave the window.

From among tuples output from the row window operator 802, the filter operator 804 outputs a tuple that satisfies the condition that the temperature is 20° C. or higher (S1.temperature>=20) to the join operator 806.

From among tuples output from the row window operator 803, the filter operator 805 outputs a tuple that satisfies the condition that the humidity is 60% or higher (S2.humidity>=60) to the join operator 806.

If the temperature sensor ID of the tuple output from the filter operator 804 matches the humidity sensor ID of the tuple output from the filter operator 805 (WHERE S1.temperature sensor ID=S2.humidity sensor ID), the join operator 806 joins the two tuples, and outputs those tuples to the aggregation operator 807. It should be noted that in order to select the tuples to be joined, the join operator 806 retains the tuples output from the filter operators 804 and 805 in the temporary storage areas $243_1$ and $243_2$, respectively, which will be described in detail by taking an example. The join operator 806 further retains in the result restore tuple areas $244_1$ and $244_2$ tuples for recalculating the processing result at or after arrival of the delay processing HBT $202_1$, which will be described later in detail. It should be noted that the tuples retained in the temporary storage areas $243_1$ and $243_2$ and in the result restore tuple areas $244_1$ and $244_2$ may be data entities or may be data containing pointers directed to the window data areas $242_1$ and $242_2$.

With respect to tuples output from the join operator 806, the aggregation operator 807 calculates the average value of the temperature (Avg(S1.temperature)) and the average value of the humidity (Avg(S2.humidity)) on a device ID basis (GROUP BY device ID), and outputs the temperature sensor ID, the average value of the temperature, and the average value of the humidity to the streaming operator 808. It should be noted that the aggregation operator 807 retains tuples for calculating an aggregation value in the temporary storage area $243_3$, which will be described later in detail. The aggregation operator 807 further retains in the result restore tuple area $244_3$ tuples for recalculating the processing result at or after the arrival of the delay processing HBT $202_1$, which will be described later in detail.

From among tuples output from the aggregation operator 807, the streaming operator 808 converts a tuple that exhibits an increase into a stream (ISTREAM), and outputs the stream as the real-time output result $250_1$. Further, the streaming operator 808 similarly outputs the delay processing HBT $202_1$ and the delay output result $251_1$ being the recalculated processing result at or after the arrival of the delay processing HBT $202_1$, which will be described later in detail.

Figure 11:
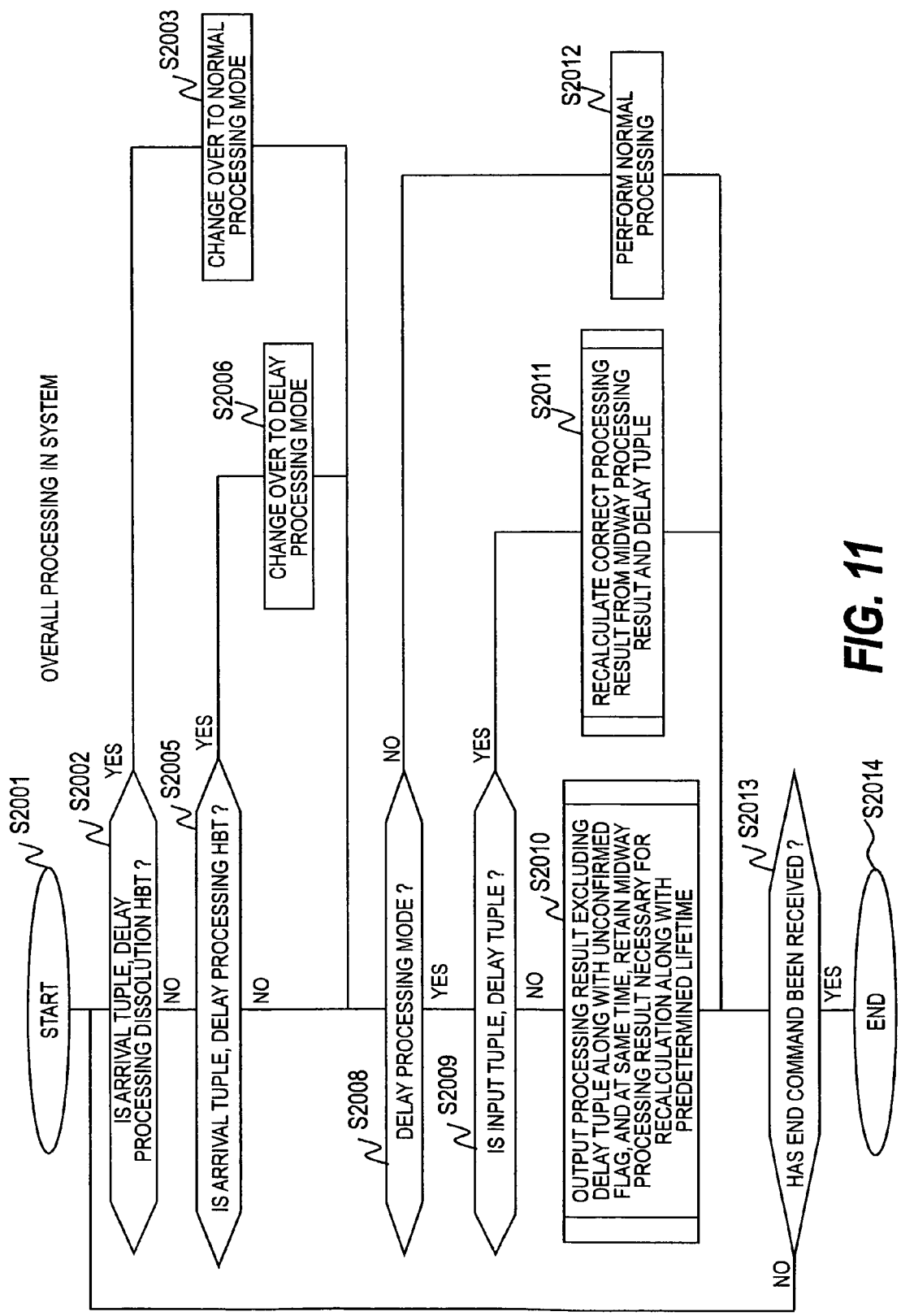
FIG. 11 is a flowchart showing an overall processing performed in the stream data processing system 100.

FIG. 11 is a flowchart showing an overall processing performed in the stream data processing system 100.

First, the delay processing dissolution HBT detection module 238 shown in FIG. 2 determines whether or not, an arrival tuple (stream data 201) is the delay processing dissolution HBT 204 (S2002). If "YES" is determined in Step S2002, since all of delay tuples 203 have arrived, a processing mode is changed over to a normal processing mode for performing a normal processing for a case where neither the delay processing HBT 202 nor the delay tuple 203 exists (S2003). If "NO" is determined in Step S2002, the delay processing HBT detection module 233 shown in FIG. 2 determines whether or not the arrival tuple is the delay processing HBT 202 (S2005).

If "YES" is determined in Step S2005, the processing mode is changed over to a delay processing mode for performing a processing for a case where the delay processing HBT 202 and the delay tuple 203 exist (S2006). If "NO" is determined in Step S2005, or if Step S2003 or S2006 ends, it is determined whether or not the processing mode is the delay processing mode (S2008).

If "NO" is determined in Step S2008, the normal processing for the case where neither the delay processing HBT 202 nor the delay tuple 203 exists is performed (S2012). If "YES" is determined in Step S2008, the delay tuple detection module 236 shown in FIG. 2 determines whether or not the arrival tuple is the delay tuple 203 (S2009).

Figure 13:
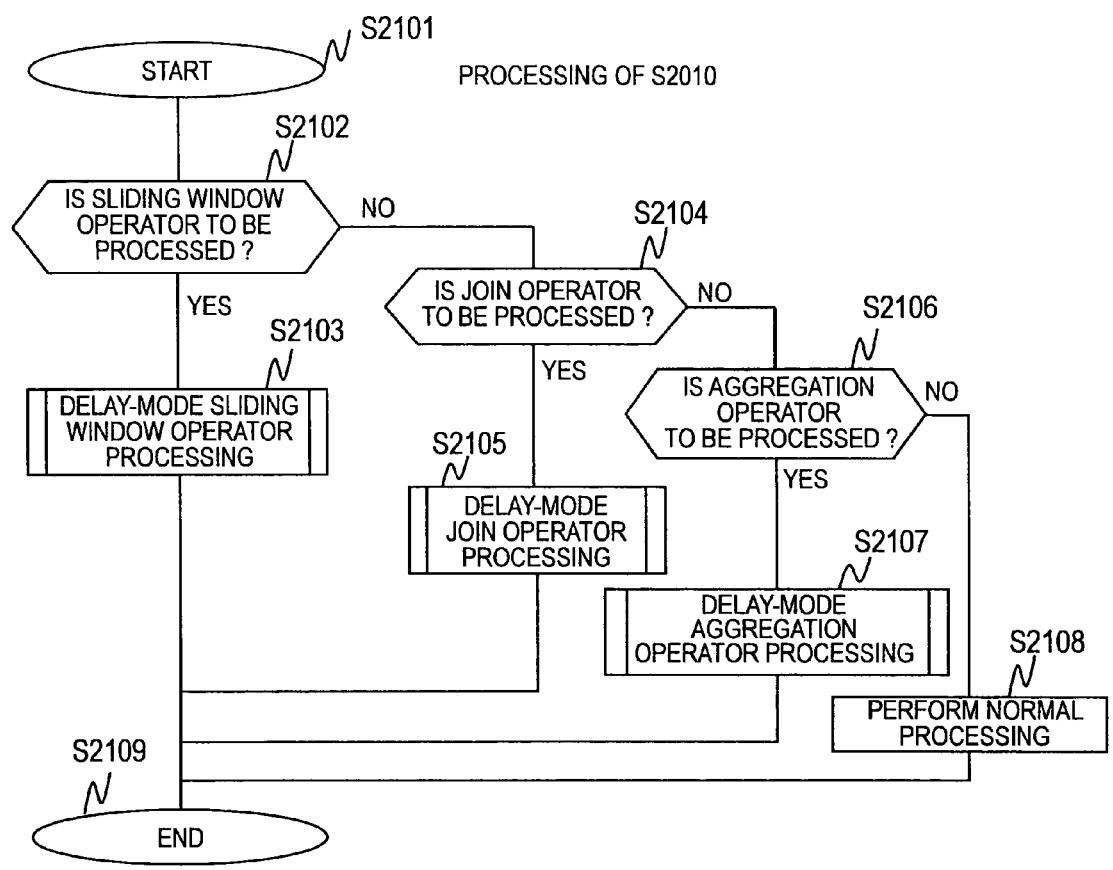
FIG. 13 is a flowchart showing the processing performed in Step S2010 shown in FIG. 11.

If "NO" is determined in Step S2009, the processing result excluding the delay tuple 203 is output along with the unconfirmed flag, and at the same time, a midway processing result necessary to reproduce (recalculate) the stream data 201 is retained along with a predetermined lifetime (S2010). FIG. 13 will be used to describe a detailed processing content of Step S2010 later. If "YES" is determined in Step S2009, a correct processing result is calculated from the midway processing result and the delay tuple (S2011).

If Step S2010, S2011, or S2012 ends, it is determined whether or not a command for bringing the stream data processing system 100 to an end has been received (S2013).

If "NO" is determined in Step S2013, the procedure returns to Step S2002, and if "YES" is determined in Step S2013, the processing for the stream data processing system 100 is brought to an end.

Hereinafter, description will be made of a processing performed when the temperature stream data $201_1$ shown in FIG. 6 and the humidity stream data $201_2$ shown in FIG. 7 are input to the query execution tree $241_1$ shown in FIG. 10 of the stream data processing system 100.

Figure 12A:
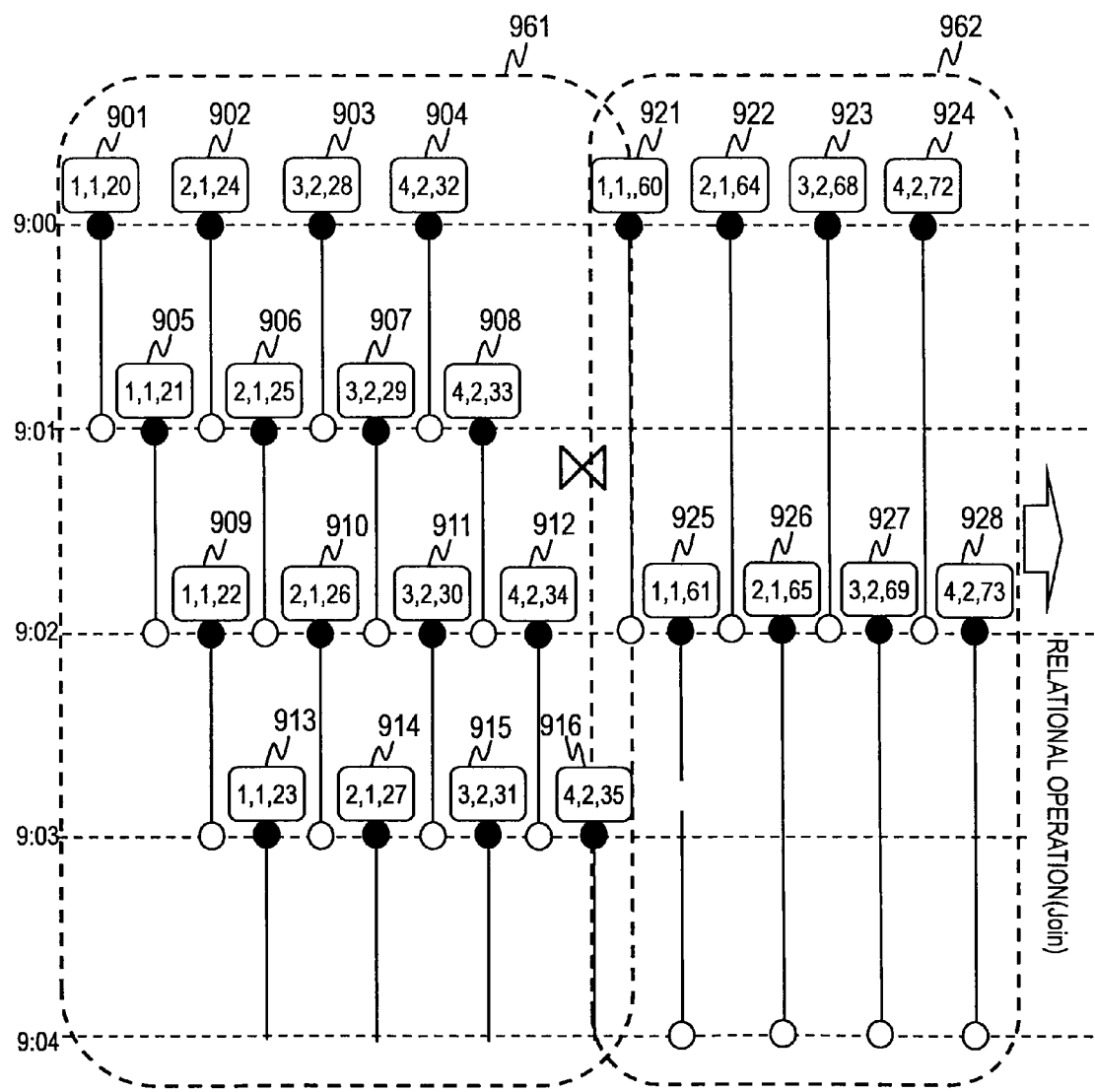
FIG. 12A is the first half of the time chart showing an example of results of the normal processing for the case where neither the delay processing HBT 202 nor the delay tuple 203 is input.
Figure 12B:
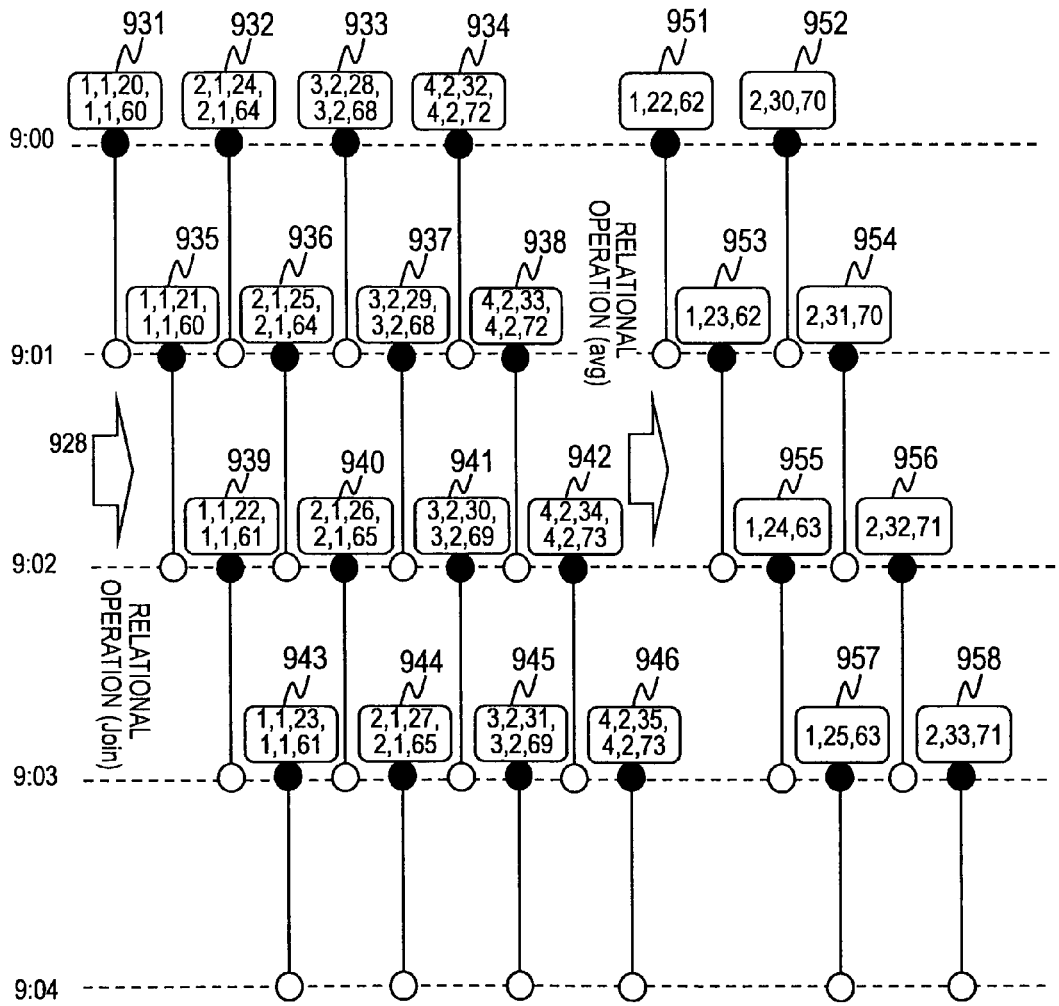
FIG. 12B is the second half of the time chart showing the example of results of the normal processing for the case where neither the delay processing HBT 202 nor the delay tuple 203 is input.

FIGS. 12A and 12B are a time chart showing results of the normal processing shown in FIG. 11 for the case where neither the delay processing HBT 202 nor the delay tuple 203 is input (Step S2012). FIG. 12A is the first half of the time chart showing an example of results of the normal processing for the case where neither the delay processing HBT 202 nor the delay tuple 203 is input. FIG. 12B is the second half of the time chart showing the example of results of the normal processing for the case where neither the delay processing HBT 202 nor the delay tuple 203 is input.

Tuples 901 to 916 represent results from processings performed on the temperature stream data $201_1$ by the row window operator 802 and the filter operator 804. Here, each black circle, each white circle, and each line connecting the two circles indicate a predetermined lifetime (60 seconds in this example) of each tuple. For example, it is indicated that the tuple 901 has the values (temperature sensor ID, device ID, temperature)=(1, 1, 20), and the lifetime thereof is from 9:00 until 9:01. It should be noted that the black circle means that a current point in time is included, while the white circle means that the current point in time is excluded.

The row window operator 802 decides that the lifetime of the tuple 901 is from 9:00 until 9:01 in a window cut out by the one latest tuple of the temperature stream data $201_1$ on a temperature sensor ID basis ([Partition by S1.temperature sensor ID rows 1]) when the tuple 905 arrives. In order to indicate the lifetime, a positive tuple indicating that the lifetime of the tuple has started is output at the start of the lifetime of the tuple, and a negative tuple indicating that the lifetime of the tuple has ended is output at the end of the lifetime of the tuple. It should be noted that this method may be replaced by a method of performing a processing by embedding an end time of the lifetime in the tuple or the like as a method of indicating the above-mentioned lifetime. It should be noted that the negative tuple and the positive tuple are the same as, for example, a "Negative Tuple" and the like described in "Efficient Execution of SlidingWindow Queries Over Data Streams" (www.cs.purdue.edu/homes/aref/papers/StreamQueryProcessing-TechReport2003.pdf).

The tuple 501 and tuples 502 to 504 shown in FIG. 6 correspond to the tuples 901 to 904 shown in FIG. 12A, respectively. A tuple 505 of FIG. 6 does not satisfy the condition that the temperature is 20° C. or higher (S1.temperature>=20), and is therefore discarded by the filter operator 804.

Tuples 921 to 928 represent results from processings performed on the humidity stream data $201_2$ shown in FIG. 7 by the row window operator 803 and the filter operator 805.

The row window operator 803 decides that the lifetime of the tuple 601 of FIG. 7 is from 9:00 until 9:02 in a window cut out within the range of past two minutes ([Range 2 minute]). The tuple 601 and tuples 602 to 604 shown in FIG. 7 correspond to the tuples 921 to 924 shown in FIG. 12A, respectively. A tuple 605 of FIG. 7 does not satisfy the condition that the humidity is 60% or higher (S2.humidity>=60), and is therefore discarded by the filter operator 805.

Next, in FIGS. 12A and 12B, results from the processing performed on the tuples 901 to 916 and the tuples 921 to 928 by the join operator 806 become the tuples 931 to 946.

If the temperature sensor ID matches the humidity sensor ID of the tuple output from the filter operator 805 (WHERE S1.temperature sensor ID=S2.humidity sensor ID), the join operator 806 joins the two tuples. Therefore, when the tuple 901 and the tuple 921 arrive, the temperature sensor ID (1) of the tuple 901 matches the humidity sensor ID (1) of the tuple 921, and hence the join operator 806 joins the tuple 901 with the tuple 921, and generates the tuple 931 having the values (temperature sensor ID, device ID, temperature, humidity sensor ID, device ID, humidity)=(1, 1, 20, 1, 1, 60). It should be noted that the lifetime of the tuple 901 ends at 9:01, and hence the generated tuple 931 also ends at 9:01.

Here, as described above, in order to select the tuples to be joined, the join operator 806 retains the tuples output from the filter operators 804 and 805 in the temporary storage areas $243_1$ and $243_2$, respectively. A tuple group indicated by a range 961 is retained in the temporary storage area $243_1$. For example, at 9:00:30, the tuples 901 to 904 are retained in the temporary storage area $243_1$. In a similar manner, a tuple group indicated by a range 962 is retained in the temporary storage area $243_2$.

Next, results from the processing performed on the tuples 931 to 946 by the aggregation operator 807 become tuples 951 to 958.

The aggregation operator 807 calculates the average value of the temperature (Avg(S1.temperature)) and the average value of the humidity (Avg(S2.humidity)) on a device ID basis (GROUP BY device ID), and outputs the temperature sensor ID, the average value of the temperature, and the average value of the humidity. Therefore, at 9:00, the device IDs of the tuples 931 and 932 are "1", and hence the average value of the temperatures of the tuples 931 and 932 is calculated as (20+24)/2=22, the average value of the humidities is similarly calculated as (60+64)/2=62, and finally, the tuple 951 having the values (device ID, average value of temperature, average value of humidity)=(1, 22, 62) is output. Further, the device IDs of the tuples 933 and 934 are "2", and hence the tuple 952 is output.

In this embodiment, to obtain an average value, a sum value and a population parameter are retained, and in a state where the sum value "20" and the population parameter "1" before the tuple 932 is input, if the tuple 932 is input, a difference is calculated as ((sum value)+24)/((population parameter)+1)= (20+24)/(1+1)=22. Here, each set of the device ID, the sum value, and the population parameter is retained in the temporary storage area 243₃. Without calculating a difference, the tuples 931 to 946 may be retained in the temporary storage area 243₂. Besides, the average value (Avg), the sum value (Sum), the count (Count), and the like can be used to calculate a difference.

Here, the aggregation operation sometimes generates a tuple called a ghost, which has no lifetime by having a timestamp of the start of the lifetime the same as a timestamp of the end of the lifetime. At the timestamp "9:01", for example: when the negative tuple of the tuple 931 arrives, the average value of the temperature becomes "24" based on an average of the tuple 932; when the tuple 935 arrives, the average value of the temperature becomes "22.5" based on the average of the tuples 935 and 932; when the negative tuple of the tuple 932 arrives, the average value of the temperature becomes "21" based on the average of the tuple 935; and when the tuple 936 arrives, the average value of the temperature becomes "23" based on the average of the tuples 935 and 936. From among the above-mentioned average values of the temperature, the average values "24", "22.5", and "21" each constitute the tuple having no lifetime. The ghost may be output as it is, or may be removed within the aggregation operator. FIGS. 12A and 12B show the results by omitting ghosts. The same holds true of the following figures.

FIG. 13 is a flowchart showing the processing performed in Step S2010 shown in FIG. 11.

Figure 14:
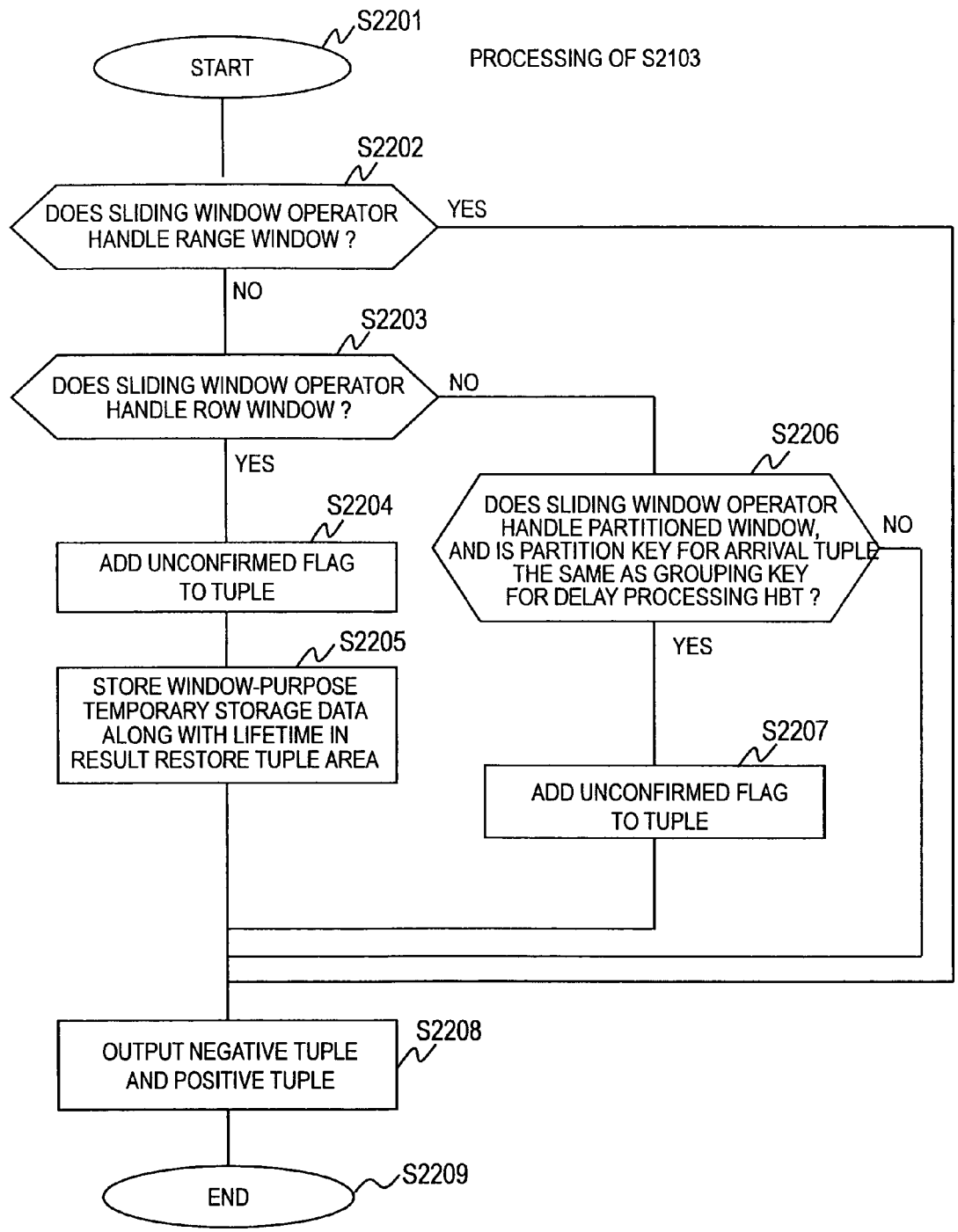
FIG. 14 is a flowchart showing a delay-mode window processing performed in Step S2103 shown in FIG. 13.

First, it is determined whether or not the operator to be processed is the row window operator 802 or 803 (S2102). If "YES" is determined in Step S2102, a delay-mode processing is performed by the row window operator 802 or 803 (S2103), and brings the processing to an end. (S2109). FIG. 14 will be used to describe a detailed processing content of Step S2103 later. If "NO" is determined in Step S2102, it is determined whether or not the operator to be processed is the join operator 806 (S2104).

Figure 15:
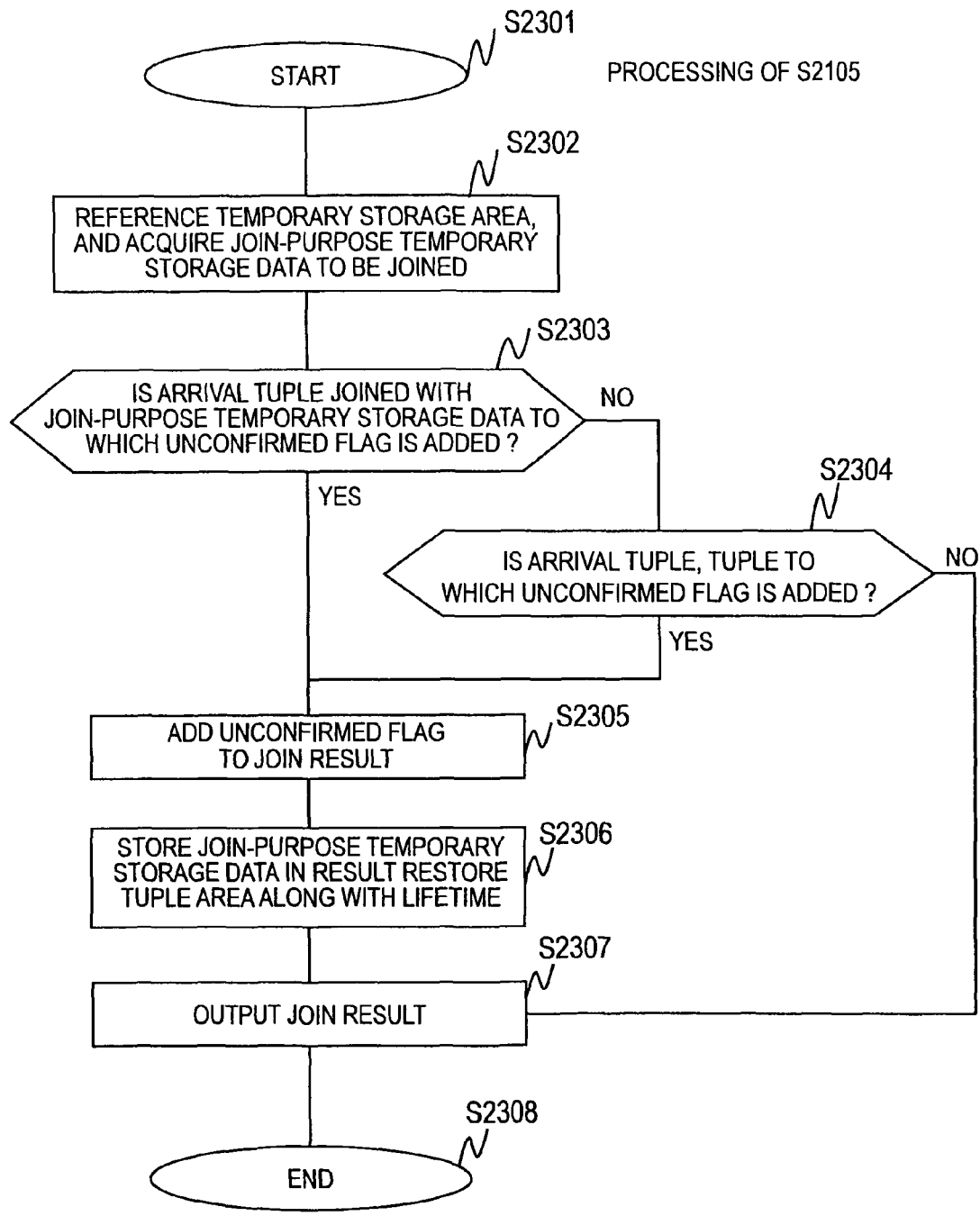
FIG. 15 is a flowchart showing a delay-mode join processing performed in Step S2105 shown in FIG. 13.

If "YES" is determined in Step S2104, a delay-mode processing is performed by the join operator 806 (S2105), and the processing is brought to an end (S2109). FIG. 15 will be used to describe a detailed processing content of Step S2105 later. If "NO" is determined in Step S2104, it is determined whether or not the operator to be processed is the aggregation operator 807 (S2106).

Figure 16:
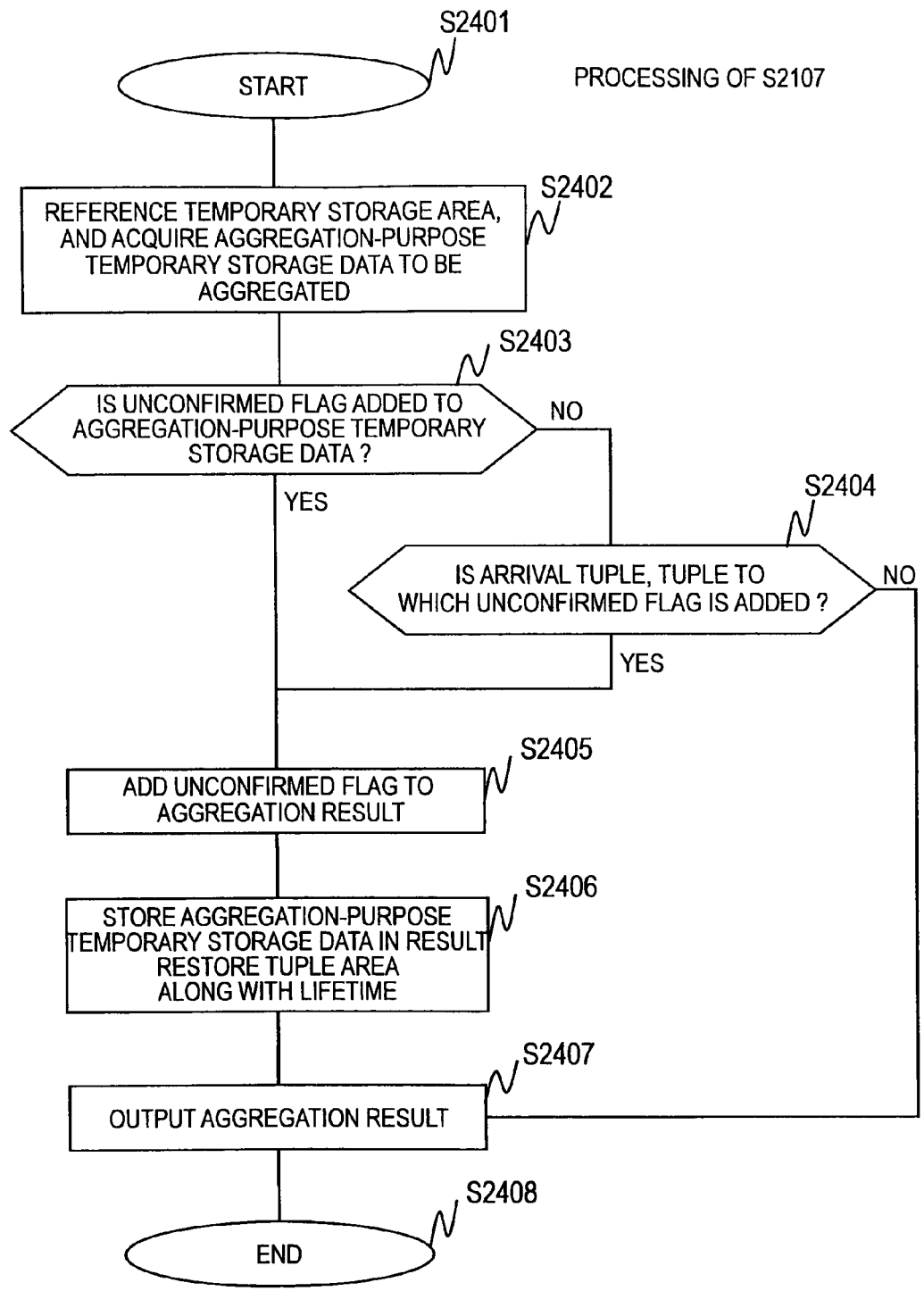
FIG. 16 is a flowchart showing a delay-mode aggregation operator processing performed in Step S2107 shown in FIG. 13.

If "YES" is determined in Step S2106, a delay-mode processing is performed by the aggregation operator 807 (S2107), and the processing is brought to an end (S2109). FIG. 16 will be used to describe a detailed processing content of Step S2107 later. If "NO" is determined in Step S2106, the normal processing for the case where neither the delay processing HBT 202 nor the delay tuple 203 exists is performed (S2108), and the processing is brought to an end (S2109).

FIG. 14 is a flowchart showing a delay-mode window processing performed in Step S2103 shown in FIG. 13.

First, it is determined whether or not the row window operator 802 or 803 handles a range window (S2202). If "NO" is determined in Step S2202, it is determined whether or not the row window operator 802 or 803 handles a row window (S2203).

If "YES" is determined in Step S2203, the unconfirmed flag addition module 234 adds the unconfirmed flag to the arrival tuple (S2204). Subsequently, window-purpose temporary storage data is stored along with the lifetime in the result restore tuple area 244 (S2205). If "NO" is determined in Step S2203, it is determined whether or not the row window operator 802 or 803 handles a partitioned window (Partition by window) and a partition key for the partitioned window of the arrival tuple is the same as a partition key for the partitioned window of the delay processing HBT 202 (S2206). If "YES" is determined in Step S2206, the unconfirmed flag addition module 234 adds the unconfirmed flag to the arrival tuple (S2207).

If Step S2205 or S2207 ends, or if "NO" is determined in Step S2202 or S2206, the negative tuple and the positive tuple are output as they are (S2208), and the processing is brought to an end (S2209).

According to the above-mentioned processing, in the delay-mode window processing, if the partitioned window is handled, and if the partition key for the partitioned window of the arrival tuple is the same as the partition key for the partitioned window of the delay processing HBT 202, the unconfirmed flag is added to thereby indicate that the delay tuple 203 exists.

FIG. 15 is a flowchart showing a delay-mode join processing performed in Step S2105 shown in FIG. 13.

First, the temporary storage area 243 is referenced to acquire join-purpose temporary storage data to be joined (S2302). Subsequently, it is determined whether or not the arrival tuple is joined with the join-purpose temporary storage data to which the unconfirmed flag is added (S2303). If "NO" is determined in Step S2303, it is determined whether or not the arrival tuple is the tuple to which the unconfirmed flag is added (S2304).

If "YES" is determined in Step S2303 or S2304, the unconfirmed flag addition module 234 adds the unconfirmed flag to a join result (S2305).

Subsequently, the join-purpose temporary storage data is stored in the result restore tuple area 244 along with the lifetime (S2306), the join result is output (S2307), and the processing is brought to an end (S2308).

If "NO" is determined in Step S2304, the join result is output (S2307), and the processing is brought to an end (S2308).

According to the above-mentioned processing, in the delay-mode join processing, if the unconfirmed flag is added to the tuple to be joined with the arrival tuple, the unconfirmed flag is added to the join result to thereby indicate that the arrival tuple is joined with the tuple for which the delay tuple 203 exists.

FIG. 16 is a flowchart showing a delay-mode aggregation operator processing performed in Step S2107 shown in FIG. 13.

First, the temporary storage area 243 is referenced to acquire aggregation-purpose temporary storage data to be aggregated (S2402). Subsequently, it is determined whether or not the unconfirmed flag is added to the acquired aggregation-purpose temporary storage data (S2403). If "NO" is determined in Step S2403, it is determined whether or not the arrival tuple is the tuple to which the unconfirmed flag is added (S2404).

If "YES" is determined in Step S2403 or S2404, the unconfirmed flag addition module 234 adds the unconfirmed flag to an aggregation result (S2405).

Subsequently, the aggregation-purpose temporary storage data is stored in the result restore tuple area 244 along with the lifetime (S2406), the aggregation result is output (S2407), and the processing is brought to an end (S2408).

If "NO" is determined in Step S2404, the aggregation result is output (S2407), and the processing is brought to an end (S2408).

According to the above-mentioned processing, in the delay-mode aggregation operator processing, if the unconfirmed flag exists in at least one of the arrival tuple and the aggregation-purpose tuple stored in the temporary storage area 243, the unconfirmed flag is added to the aggregation result to thereby indicate that the aggregation result excludes the delay tuple 203.

Hereinafter, description will be made of a processing performed when the temperature stream data $201_1$ shown in FIG. 6 and the humidity stream data $201_2$ shown in FIG. 7 are input to the query execution tree $241_1$ shown in FIG. 10.

Figure 17A:
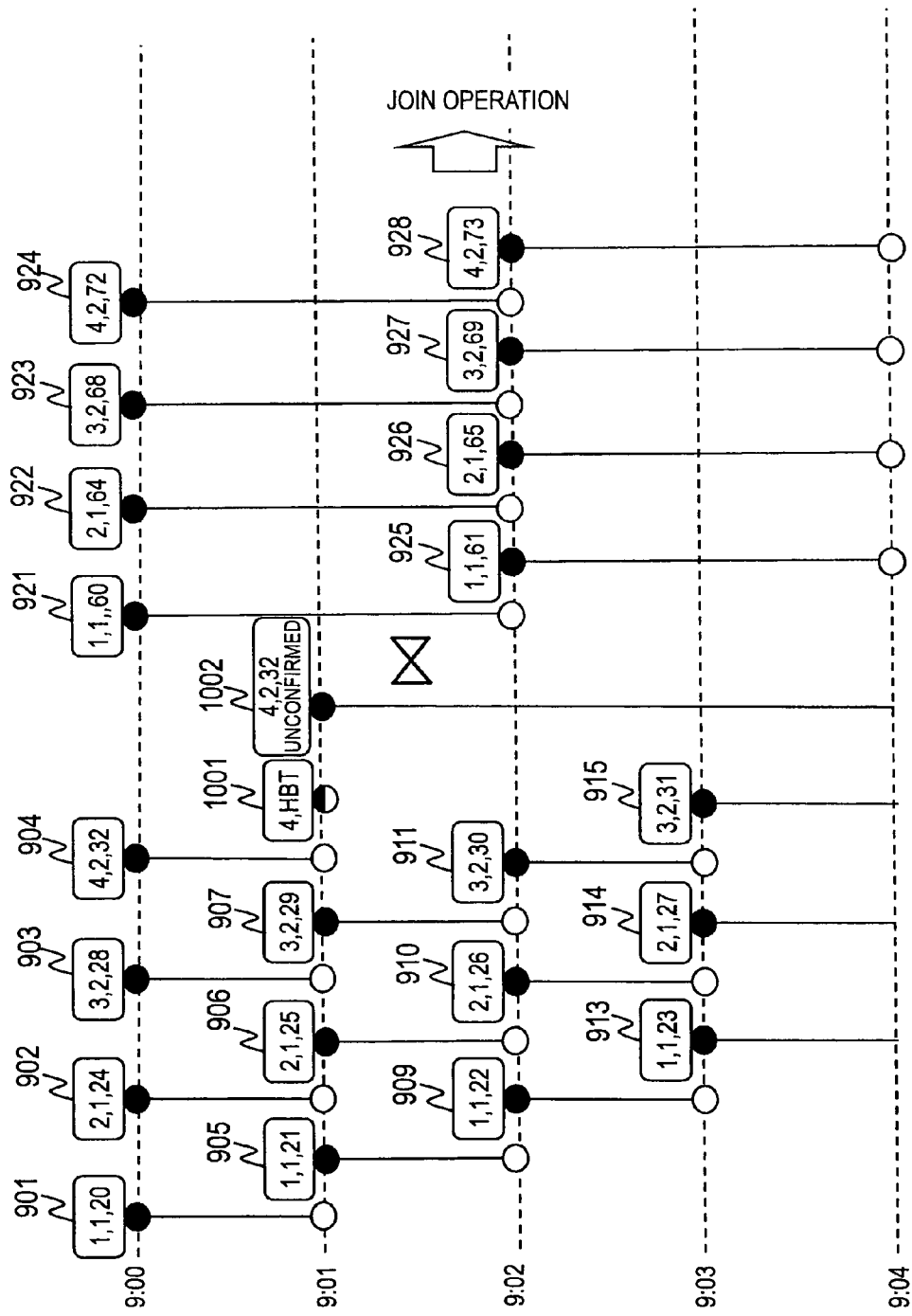
FIG. 17A is a time chart showing results of the processing of receiving tuples (the stream data 201 and the delay tuple 203).
Figure 17B:
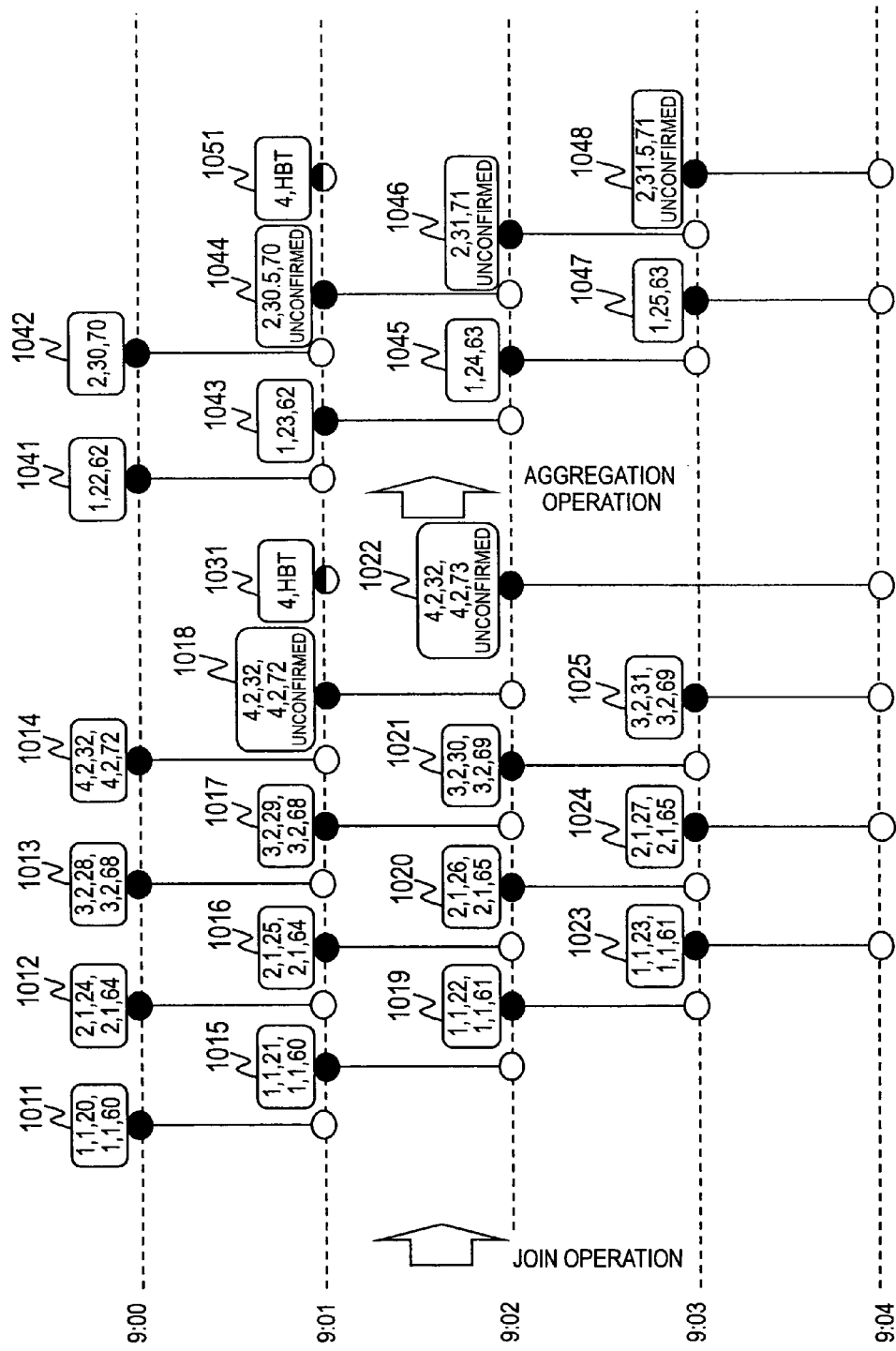
FIG. 17B is a time chart showing results of the join processing and the aggregation processing for the received tuples.

FIGS. 17A and 17B are a time chart showing processing results obtained in a case where the delay processing HBT 202 arrives by using the flowcharts showing in FIGS. 11 and 13 to 16. FIG. 17A is a time chart showing results of the processing of receiving tuples (the stream data 201 and the delay tuple 203). FIG. 17B is a time chart showing results of the join processing and the aggregation processing for the received tuples.

The tuples 509, 514, and 519 shown in FIG. 6 arrive collectively at 9:05 (which is an actual time at which the tuples arrive at the stream data processing system 100, and is different from the application timestamp), and the delay processing HBTs 202 are transmitted at 9:01 (which is also an actual time, and is different from the application timestamp). In FIG. 17A, the tuples 901 to 915 correspond to the tuples 901 to 915 shown in FIG. 12A, respectively, and a delay processing HBT 1001 arrives instead of the tuples 908, 912, and 916.

First, in the window operation, for the tuples 901 to 907, "NO" is determined in Steps S2002, S2005, and S2008 shown in FIG. 11, and hence the normal processing of Step S2012 is performed, which produces the same results as shown in FIGS. 12A and 12B.

Subsequently, the delay processing HBT 1001 arrives, and when the row window operator 802 or 803 performs the processing thereon, "NO" is determined in Step S2002 shown in FIG. 11, and "YES" is determined in Step S2005, which is followed by the execution of Step S2006. Then, the processing mode is changed over to the delay processing mode in Step S2006, and hence "YES" is determined in Step S2008. Then, "NO" is determined in Step S2009, which is followed by the execution of Step S2010. Then, "YES" is determined in Step S2102 shown in FIG. 13, which is followed by the execution of Step S2103.

The temperature stream data $201_1$ is handled by the partitioned window (Partition by window), and hence "NO" is determined in Steps S2202 and S2203 shown in FIG. 14. Then, the partitioned window is handled, and both the partition key for the tuple 904 and the partition key (node ID) for the delay processing HBT 1001 are "4", and hence "YES" is determined in Step S2206.

Here, a new tuple may arrive at 9:01, and hence the lifetime of the tuple 904 is not confirmed. This state is set as an unconfirmed state, and in Step S2207, the unconfirmed flag is added to the tuple. Therefore, in Step S2207, a tuple 1002 to which the unconfirmed flag is added is output. Here, the negative tuple of the tuple 904 and the delay processing HBT 1001 are also output at the same application timestamp as that of the tuple 1002 to which the unconfirmed flag is added.

In the join operation, when the tuples 901 to 907 and 921 to 924 arrive, the determination is performed in the same manner as the above-mentioned window operation, and the normal processing of Step S2012 is performed to output tuples 1011 to 1017 that are the same results as the tuples 931 to 937 shown in FIG. 12B, respectively.

In the case of the join operation, when the tuple 1002 arrives, the determination is performed in the same manner as the window operation, which is followed by the execution of Step S2105 shown in FIG. 13. In Step S2302 shown in FIG. 15, the tuple 924 is acquired as the join-purpose temporary storage data to be joined. The tuple 924 is not the tuple to which the unconfirmed flag is added, and hence "NO" is determined in Step S2303. Then, the tuple 1002 is the tuple to which the unconfirmed flag is added, and hence "YES" is determined in Step S2304. Then, in Step S2305, the unconfirmed flag is added to the join result to generate a tuple 1018 to which the unconfirmed flag is added shown in FIG. 17B.

Figure 19A:
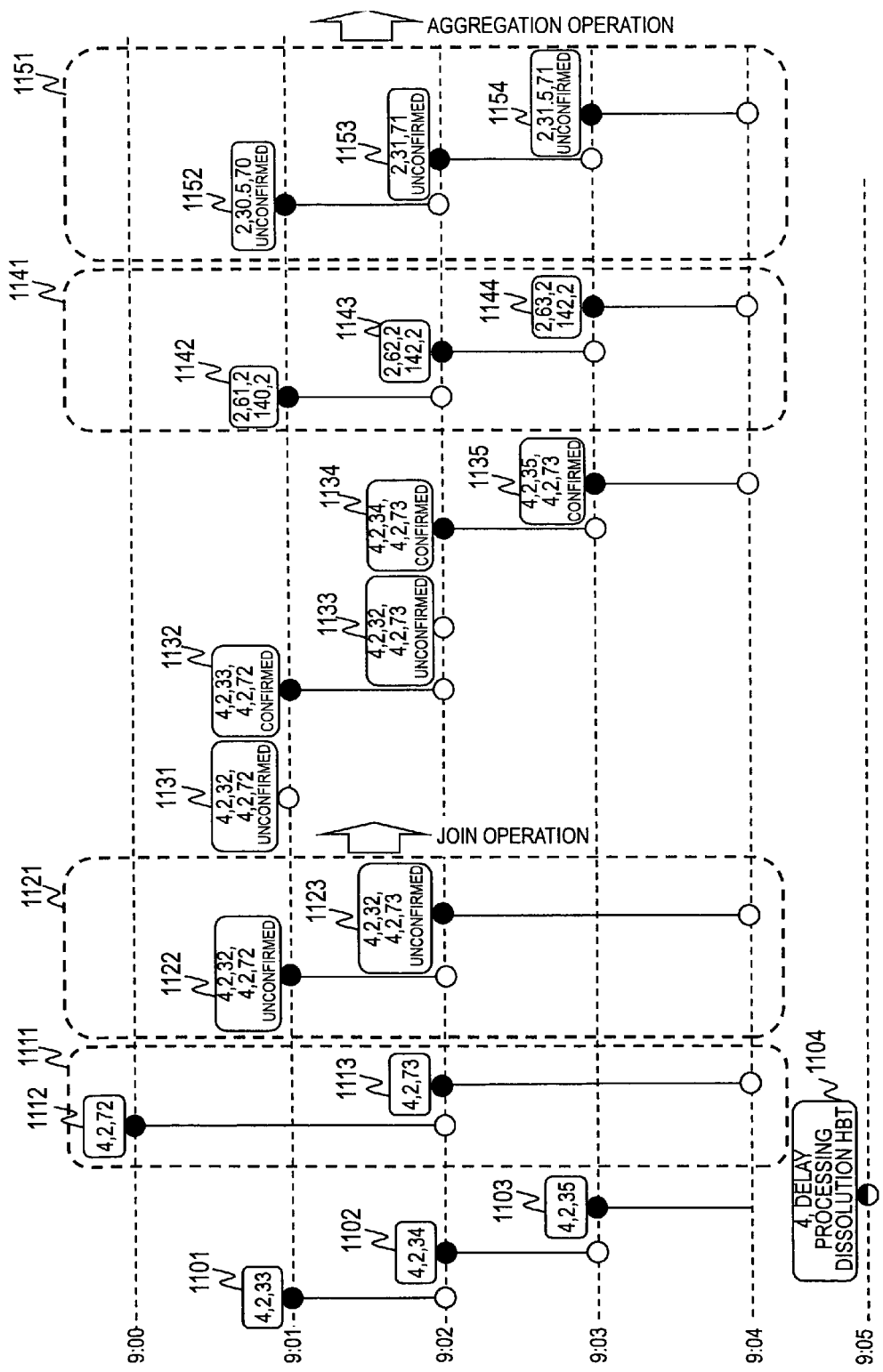
FIG. 19A is a time chart showing results of the processing of receiving and joining tuples.

Subsequently, in Step S2306, as the tuple to be joined, a tuple of the humidity stream data $201_2$ which has a node ID of "4" (tuple 1112 shown in FIG. 19A) is stored along with the lifetime in the result restore tuple area 244 for join-purpose temporary storage data 1111 shown in FIG. 19A. Further, the join result having a node ID of "4", which is a tuple 1122 shown in FIG. 19A, is stored along with the lifetime in the result restore tuple area 244 for join-purpose temporary storage data 1121 shown in FIG. 19A. Then, in Step S2307, the tuple 1018 to which the unconfirmed flag is added is output, and the processing is brought to an end. Here, as shown in FIG. 17B, the negative tuple of the tuple 1014 and a delay processing HBT 1031 are also output at the same application timestamp as that of the tuple 1018 to which the unconfirmed flag is added.

Further, when the tuple 928 of FIG. 17A arrives, in Step S2302 shown in FIG. 15, the tuple 1002 is acquired as the join-purpose temporary storage data to be joined. The tuple 1002 is the tuple to which the unconfirmed flag is added, and hence "YES" is determined in Step S2303. Then, in Step S2305, the unconfirmed flag is added to the join result to generate a tuple 1022 to which the unconfirmed flag is added shown in FIG. 17B.

Subsequently, in Step S2306, as the tuple to be joined shown in FIG. 19A, a tuple of the humidity stream data $201_2$ which has a node ID of "4" (tuple 1113 shown in FIG. 19A) is stored along with the lifetime in the result restore tuple area 244 for the join-purpose temporary storage data 1111 shown in FIG. 19A. Further, the join result having a node ID of "4", which is a tuple 1123 shown in FIG. 19A, is stored along with the lifetime in the result restore tuple area 244 for the join-purpose temporary storage data 1121 shown in FIG. 19A. Then, in Step S2307, the tuple 1022 to which the unconfirmed flag is added is output, and the processing is brought to an end.

In the aggregation operation, the determination is performed in the same manner as the above-mentioned window operation, and the normal processing of Step S2012 is performed to output tuples 1041 to 1043 that are the same results as the tuples 951 to 953 shown in FIG. 12B, respectively.

In the case of the aggregation operation, when the tuple 1018 arrives, the determination is performed in the same manner as the window operation, which is followed by the execution of Step S2107 shown in FIG. 13. In Step S2402 shown in FIG. 16, after the negative tuple of the tuple 1014 has been processed, the aggregation-purpose temporary storage data to be aggregated has the values "temperature sum value "29", temperature population parameter "1", humidity sum value "68", humidity population parameter "1"". The aggregation-purpose temporary storage data is not the tuple to which the unconfirmed flag is added, and hence "NO" is determined in Step S2403. Then, the tuple 1018 is the tuple to which the unconfirmed flag is added, and hence "YES" is determined in Step S2404. Then, in Step S2405, the unconfirmed flag is added to the aggregation result to generate a tuple 1044 to which the unconfirmed flag is added.

Subsequently, in Step S2406, as the tuple to be aggregated, the aggregation-purpose temporary storage data having a node ID of "2", which is a tuple 1142 shown in FIG. 19A which has the values "device ID "2", temperature sum value "61", temperature population parameter "2", humidity sum value "140", humidity population parameter "2"", is stored along with the lifetime for aggregation-purpose temporary storage data 1141. Further, a tuple 1152 shown in FIG. 19A is stored along with the lifetime in the result restore tuple area 244 for aggregation-purpose temporary storage data 1151 shown in FIG. 19A. Then, in Step S2407, the tuple 1044 to which the unconfirmed flag is added is output, and the processing is brought to an end. Here, the negative tuple of the tuple 1042 and a delay processing HBT 1051 are also output at the same application timestamp as that of the tuple 1044 to which the unconfirmed flag is added.

Further, when the tuple 1022 arrives, in Step S2402 shown in FIG. 16, the values "temperature sum value "61", temperature population parameter "2", humidity sum value "140", humidity population parameter "2"" and a tuple 1143 are acquired as the aggregation-purpose temporary storage data. An unconfirmed flag is added to the aggregation-purpose temporary storage data having the values "temperature sum value "61", temperature population parameter "2", humidity sum value "140", humidity population parameter "2"" and the tuple 1143, and hence "YES" is determined in Step S2403. Then, in Step S2405, the unconfirmed flag is added to the aggregation result to generate a tuple 1046 to which the unconfirmed flag is added.

Subsequently, in Step S2406, as the tuple to be aggregated, the aggregation-purpose temporary storage data having a node ID of "2", which is a tuple 1143 shown in FIG. 19A which has the values "device ID "2", temperature sum value "62", temperature population parameter "2", humidity sum value "142", humidity population parameter "2"", is stored along with the lifetime for the aggregation-purpose temporary storage data 1141. Further, a tuple 1144 shown in FIG. 19A is stored along with the lifetime in the result restore tuple area 244 for the aggregation-purpose temporary storage data 1141 shown in FIG. 19A. Then, in Step S2407, the tuple 1046 to which the unconfirmed flag is added is output, and the processing is brought to an end.

Here, if a joining key is not contained in the delay processing HBT 1001, the unconfirmed flag is added to all of the join results. The unconfirmed flag of any form may be used as long as the unconfirmed state can be distinguished from another state. For example, the flag may take a value of "1" for the unconfirmed state, and take a value of "0" for another state.

Further, depending on an amount of the join results, original data before joining may be retained. The amount of the join results and the original data before joining may be monitored to select one having a smaller amount.

Further, in the above description, once there occurs a delay with the delay tuple 203, all of the tuples at or after the application timestamp arrive with a delay, and there occurs no overtaking in an application timestamp order. However, even if there occurs overtaking in the application timestamp order, the unconfirmed flag is added to output the processing result in the same manner.

Figure 18:
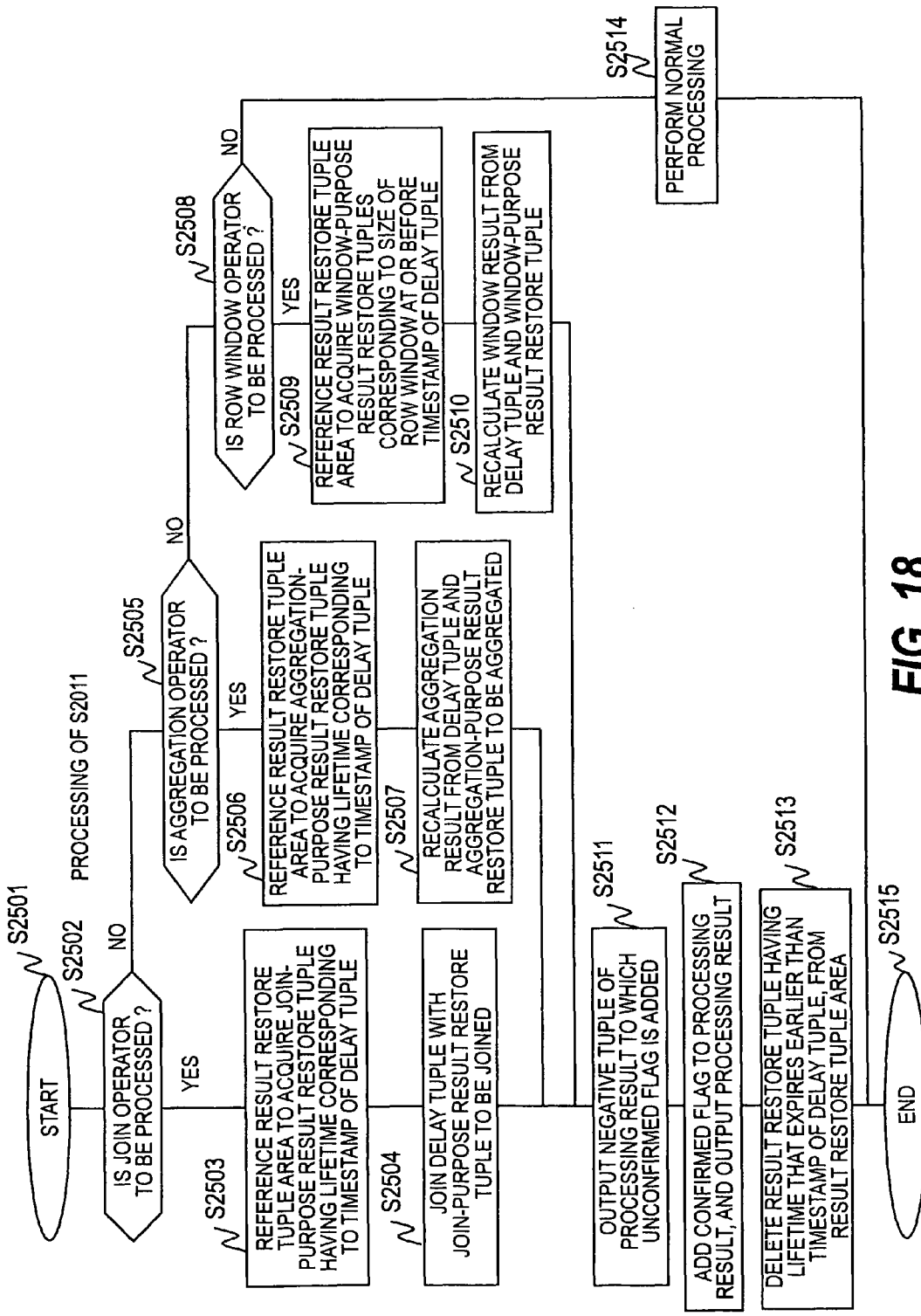
FIG. 18 is a flowchart showing the processing of Step S2011 shown in FIG. 11.

FIG. 18 is a flowchart showing the processing of Step S2011 shown in FIG. 11.

First, it is determined whether or not the operator to be processed is the join operator 806 (S2502). If "YES" is determined in Step S2502, the result restore tuple area 244 is referenced to acquire a join-purpose result restore tuple having the lifetime corresponding to the value of the application timestamp column 301 of the delay tuple 203 (S2503), and join the delay tuple 203 with the join-purpose result restore tuple to be joined (S2504). If "NO" is determined in Step S2502, it is determined whether or not the operator to be processed is the aggregation operator 807 (S2505).

If "YES" is determined in Step S2505, the result restore tuple area 244 is referenced to acquire a aggregation-purpose result restore tuple having the lifetime corresponding to the value of the application timestamp column 301 of the delay tuple 203 (S2506), and recalculate the aggregation result from the delay tuple 203 and the aggregation-purpose result restore tuple to be aggregated (S2507). If "NO" is determined in Step S2505, it is determined whether or not the operator to be processed is the row window operator 802 or 803 (S2508).

If "YES" is determined in Step S2508, the result restore tuple area 244 is referenced to acquire window-purpose result restore tuples corresponding to a size of the row window at or before the value of the application timestamp column 301 of the delay tuple 203 (S2509), and recalculate the window result from the delay tuple 203 and the window-purpose result restore tuple (S2510). If "NO" is determined in Step S2508, the normal processing for the case where neither the delay processing HBT 202 nor the delay tuple 203 exists is performed (S2514), and the processing is brought to an end (S2515).

Further, if Step S2504, S2507, or S2510 ends, the negative tuple of the processing result to which the unconfirmed flag is added is output (S2511), and the unconfirmed flag addition module 234 adds the confirmed flag, which indicates that the processing result has been confirmed by recalculating the processing result based on the data that has arrived with a delay, to the processing result, and outputs the processing result (S2512). Then, the result restore tuple having the lifetime that expires earlier than the value of the application timestamp column 301 of the delay tuple 203 is deleted from the result restore tuple area (S2513), and the processing is brought to an end (S2515).

Here, if there are a plurality of delay tuples 203, the confirmed flag is not always added to the result of the recalculation using the result restore tuple, and if the state remains the unconfirmed state, the unconfirmed flag is again added to output the recalculation result.

Further, upon execution of the recalculation of the delay tuple 203, the query execution tree 241 shown in FIG. 10 may be used, the above-mentioned query execution tree 241 may be copied to create the same query execution tree 241 for the execution of the recalculation.

Figure 19B:
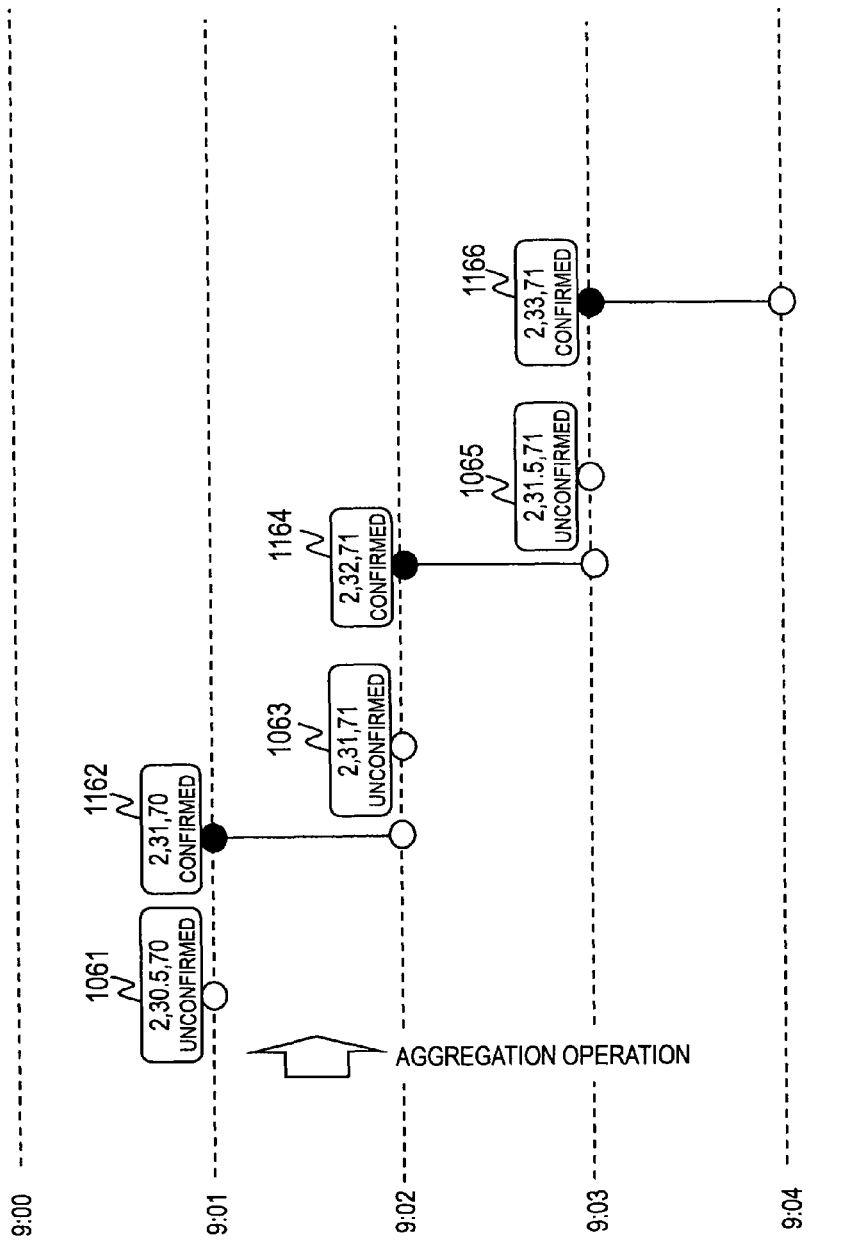
FIG. 19B is a time chart showing results of the recalculation processing after receiving the delay tuple 203.

Hereinafter, description will be made of a processing performed when the temperature stream data 201$_1$ shown in FIG. 6 and the humidity stream data 201$_2$ shown in FIG. 7 are input to the query execution tree 241$_1$ shown in FIG. 10. FIGS. 19A and 19B are a time chart showing processing results obtained in a case where the delay tuple 203 arrives by using the flowcharts showing in FIGS. 11 and 18. FIG. 19A is a time chart showing results of the processing of receiving and joining tuples (the stream data 201 and the delay tuple 203). FIG. 19B is a time chart showing results of the recalculation processing after receiving the delay tuple 203.

The tuples 509, 514, and 519 shown in FIG. 6 arrive collectively at 9:05 (which is an actual time at which the tuples arrive at the stream data processing system 100, and is different from the application timestamp), and correspond to tuples 1101 to 1103 shown in FIG. 19A, respectively. Here, the tuples 1101 to 1103, which are the delay tuples 203, arrive at 9:05, but it should be noted that the application timestamps are 9:01, 9:02, and 9:03, respectively. Further, a delay processing dissolution HBT 1104, which is the delay processing dissolution HBT 204 indicating that there is no more delay tuple 203, arrives at 9:05, and has a system timestamp of 9:05.

When the tuple 1101 being the delay tuple 203 arrives, in the flowchart shown in FIG. 11, "NO" is determined in Steps S2002 and S2005, and "YES" is determined in Steps S2008 and S2009, which is followed by Step S2011, in which the processing of the recalculation from the midway processing result and the delay tuple is executed.

In the case of the window operation, since the partitioned window is handled, in the flowchart shown in FIG. 18, "NO" is determined in Steps S2502, S2505, and S2508, which is followed by Step S2514. Therefore, when the tuple 1102 arrives, the negative couple of the tuple 1101 having a partition key of "4" and the positive tuple of the tuple 1102 are output. The above-mentioned processing is the same as the processing for the case where there exists no delay tuple 203.

Next, in the case of the join operation, "YES" is determined in Step S2502, which is followed by Step S2503. In Step S2503, when the tuple 1101 arrives, join-purpose temporary storage data 1111 is referenced to acquire the join-purpose result restore tuple 1112 having the lifetime corresponding to the application timestamp "9:01" of the tuple 1101.

Subsequently, since the tuples 1101 and 1112 are to be joined judging from their sensor IDs, in Step S2504, the tuples 1101 and 1112 are joined with each other to generate a tuple 1132.

Subsequently, in Step S2511, a tuple 1131, which is the negative tuple of the tuple 1112 being the join results to which the unconfirmed flag is added is output. Then, in Step S2512, the confirmed flag is added to the tuple 1132, and the tuple 1132 is output. Then, in Step S2513, no processing is performed because there is no result restore tuple having the lifetime that expires earlier than the application timestamp "9:01" of the tuple 1101.

When the tuple 1102 arrives, by the same processing, tuples 1133 and 1134 are generated, and in Step S2513, the result restore tuple 1112 having the lifetime that expires earlier than the application timestamp "9:02" of the tuple 1102 is deleted from join-purpose temporary storage data 1111 in the result restore tuple area 244. At the same time, the result restore tuple 1122 is deleted from join-purpose temporary storage data 1121 in the result restore tuple area 244.

In the case of the aggregation operation, when the tuple 1131 arrives, "NO" is determined in Step S2502, and "YES" is determined in Step S2505, which is followed by Step S2506.

In Step S2506, when the tuple 1131 arrives, aggregation-purpose temporary storage data 1141 in the result restore tuple area 244 is referenced to acquire the aggregation-purpose result restore tuple 1142 having the lifetime corresponding to the application timestamp "9:01" of the tuple 1133. Then, in Step S2507, the aggregation result is recalculated from the tuple 1131 and the aggregation-purpose result restore tuple 1142 to be aggregated, to thereby obtain a temporary storage tuple having the values "device ID "2", temperature sum value "29", temperature population parameter "1", humidity sum value "68", humidity population parameter "1"", and a ghost tuple having the values "device ID "2", temperature average value "29", humidity average value "68"" is generated.

When the tuple 1132 arrives, the temporary storage tuple having the values "device ID "2", temperature sum value "62", temperature population parameter "2", humidity sum value "140", humidity population parameter "2"" is obtained, and as shown in FIG. 19B, a tuple 1162 having the values "device ID "2", temperature average value "31", humidity average value "70"" is generated.

Subsequently, in Step S2511, a tuple 1061 of FIG. 19B, which is the negative tuple of the aggregation result to which the unconfirmed flag is added, is output. Then, in Step S2512, the confirmed flag is added to the tuple 1062, and the tuple 1062 is output. Then, in Step S2513, no processing is performed because there is no result restore tuple having the lifetime that expires earlier than the application timestamp "9:01" of the tuples 1131 and 1132.

When the tuples 1133 and 1134 arrive, by the same processing, tuples 1163 and 1164 are generated, and in Step S2513, the result restore tuple 1142 having the lifetime that expires earlier than the application timestamp "9:02" of the tuples 1133 and 1134 is deleted from aggregation-purpose temporary storage data 1141 in the result restore tuple area 244. At the same time, the result restore tuple 1152 is deleted from aggregation-purpose temporary storage data 1151 in the result restore tuple area 244.

At the application timestamp "9:05", when the delay processing dissolution HBT 1104 arrives, join-purpose temporary storage data 1111, 1121, and aggregation-purpose temporary storage data 1141 and 1151 disappear.

FIG. 20 is an explanatory diagram exemplifying the real-time output result 250 output by the query execution module 230. FIG. 20 shows the real-time output result 250 obtained when the temperature stream data $201_1$ shown in FIG. 6 and the humidity stream data $201_2$ shown in FIG. 7 are input to the query execution tree $241_1$ shown in FIG. 10. Here, the tuples 509, 514, and 519 shown in FIG. 6 arrive collectively at 9:05 (which is an actual time at which the tuples arrive at the stream data processing system 100, and is different from the application timestamp), and the delay processing HBTs 202 are transmitted at 9:01 (which is also an actual time at which the tuples arrive at the stream data processing system 100, and is different from the application timestamp).

An application timestamp column 1201 and a device ID column 1202 correspond to the application timestamp column 301 and the device ID column 303 shown in FIG. 6, respectively. In addition, average values of the temperatures of the temperature stream data $201_1$ are output to an Avg (temperature) column 1203. Average values of the humidities of the humidity stream data $201_2$ are output to an Average (humidity) column 1204. In a confirmed/unconfirmed flag column 1205, one of the confirmed flag and the unconfirmed flag is added in a case where the output result is in the confirmed state or the unconfirmed state, respectively.

For example, a row 1206 indicates that at the application timestamp "9:00", the device ID is "1", the average value of the temperature is "22", the average value of the humidity is "62", and the confirmed/unconfirmed flag is not added.

Here, in the processing results of the execution tree shown in FIGS. 17A and 17B, the results obtained by converting the tuples 1041 to 1048 into a stream correspond to the row 1206 and rows 1207 to 1213 of FIG. 20, respectively.

FIG. 21 is an explanatory diagram exemplifying the delay output result 251 output by the query execution module 230. FIG. 21 shows the delay output result 251 obtained when the temperature stream data $201_1$ shown in FIG. 6 and the humidity stream data $201_2$ shown in FIG. 7 are input to the query execution tree $241_1$ shown in FIG. 10. Here, the tuples 509, 514, and 519 shown in FIG. 6 arrive collectively at 9:05 (which is an actual time at which the tuples arrive at the stream data processing system 100, and is different from the application timestamp), and the delay processing dissolution HBT 204 is transmitted at 9:05 (which is also an actual time at which the tuple arrives at the stream data processing system 100, and is different from the application timestamp).

An application timestamp column 1301 and a device ID column 1302 correspond to the application timestamp column 301 and the device ID column 303 shown in FIG. 6, respectively. In addition, average values of the temperatures of the temperature stream data $201_1$ are output to an Avg (temperature) column 1303. Average values of the humidities of the humidity stream data $201_2$ are output to an Average (humidity) column 1304. In a confirmed/unconfirmed flag column 1305, one of the confirmed flag and the unconfirmed flag is added in a case where the output result is in the confirmed state or the unconfirmed state, respectively.

For example, a row 1306 indicates that at 9:05 (which is an actual time at which the tuple arrives at the stream data processing system 100, and is different from the application timestamp), the application timestamp "9:01" in the application timestamp column 1301, the device ID is "2" in the device ID column 1302, the average value of the temperature is "31" in the Avg(temperature) column 1303, the average value of the humidity is "70" in Avg(humidity) column 1304, and the confirmed flag is added.

Here, in the processing results of the execution tree shown in FIG. 19B, the results obtained by converting the tuples 1162, 1164, and 1166 into a stream correspond to the row 1306 and rows 1307 and 1308 of FIG. 21, respectively. Here, in a streaming operation, only an increase is output (IS-TREAM), and hence the tuple 1061 and tuples 1063 and 1065 are not output.

Figure 22:
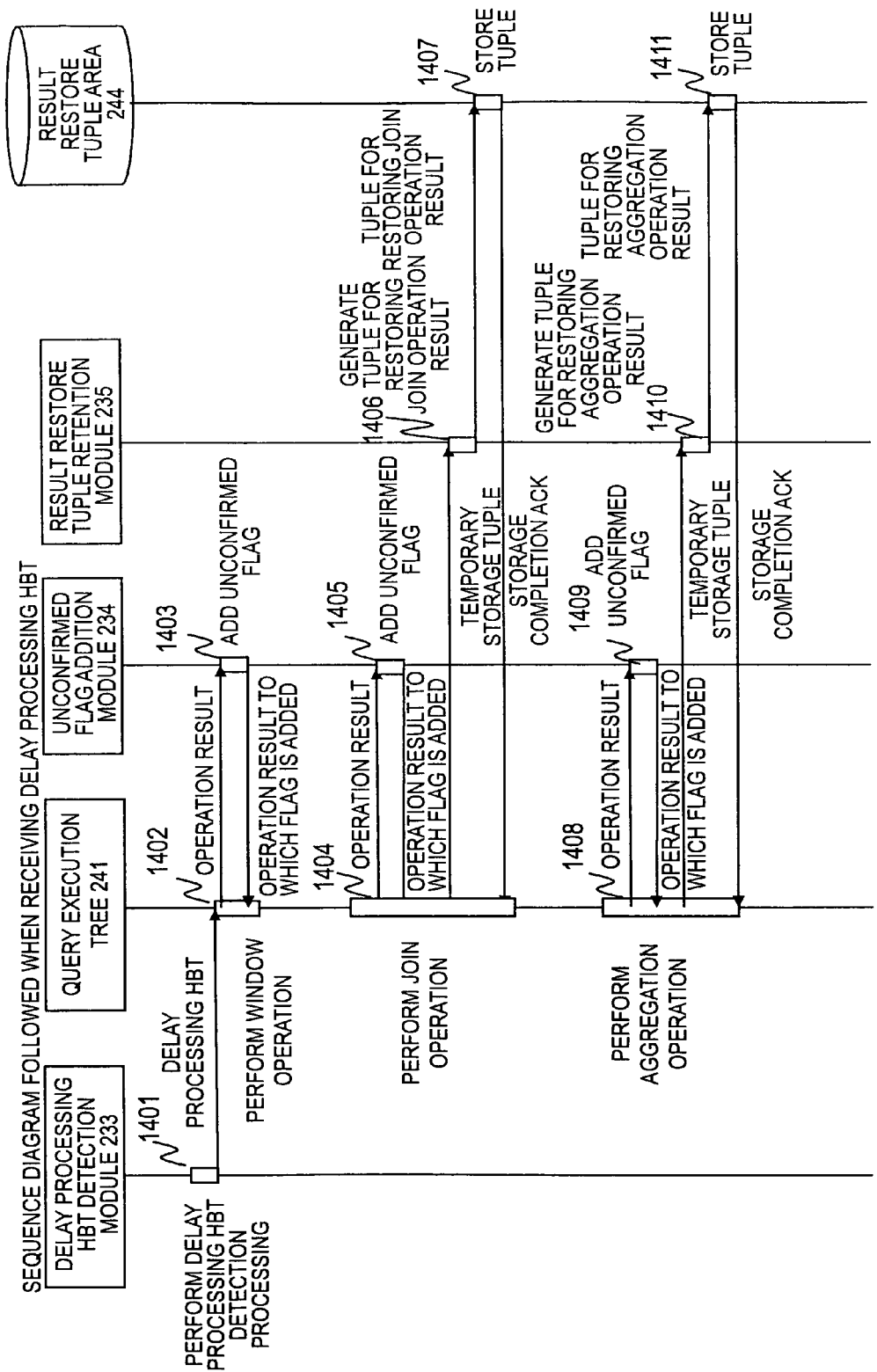
FIG. 22 is a sequence diagram followed when receiving the delay processing HBT 202.

FIG. 22 is a sequence diagram followed when receiving the delay processing HBT 202.

First, the delay processing HBT detection module 233 shown in FIG. 2 detects the delay processing HBT 202 from the received stream data 201 (Processing 1401). Then, the delay processing HBT detection module 233 transmits the delay processing HBT 202 to the query execution tree 241 shown in FIG. 2, and the query execution tree 241 performs the window operation (Processing 1402). Then, the query execution tree 241 transmits an operation result obtained by the operation performed in Processing 1402 to the unconfirmed flag addition module 234 shown in FIG. 2, and the unconfirmed flag addition module 234 adds the unconfirmed flag thereto (Processing 1403). Then, the unconfirmed flag addition module 234 transmits the operation result to which the flag is added to the query execution tree 241.

Subsequently, the query execution tree 241 performs the above-mentioned join operation (Processing 1404). The query execution tree 241 transmits a join operation result to the unconfirmed flag addition module 234, and the unconfirmed flag addition module 234 adds the unconfirmed flag thereto (Processing 1405) and transmits to the operation result to which the flag is added to the query execution tree 241.

Then, the query execution tree 241 causes the result restore tuple retention module 235 shown in FIG. 2 to generate a tuple for restoring the join operation result (Processing 1406). Then, the result restore tuple retention module 235 transmits the tuple for restoring the join operation result to the result restore tuple area 244 shown in FIG. 2. The result restore tuple area 244 has the tuple for restoring the join operation result stored thereinto (Processing 1407), and has a storage completion ACK transmitted to the query execution tree 241.

Subsequently, the query execution tree 241 performs the above-mentioned aggregation operation (Processing 1408). The query execution tree 241 transmits an aggregation operation result to the unconfirmed flag addition module 234, and the unconfirmed flag addition module 234 adds the unconfirmed flag thereto (Processing 1409) and transmits the operation result to which the flag is added to the query execution tree 241. Then, the query execution tree 241 causes the result restore tuple retention module 235 to generate a tuple for restoring the aggregation operation result from the operation result to which the flag is added (Processing 1410), and to transmit the tuple for restoring the aggregation operation result to the result restore tuple area 244. The result restore tuple area 244 has the tuple for restoring the aggregation operation result stored thereinto (Processing 1411), and has the storage completion ACK transmitted to the query execution tree 241, which brings the procedure to an end.

According to the above-mentioned procedure, based on the delay processing HBT 202, the query execution module 230 and the query execution area 240 execute the window operation, the join operation, and the aggregation operation.

Figure 23:
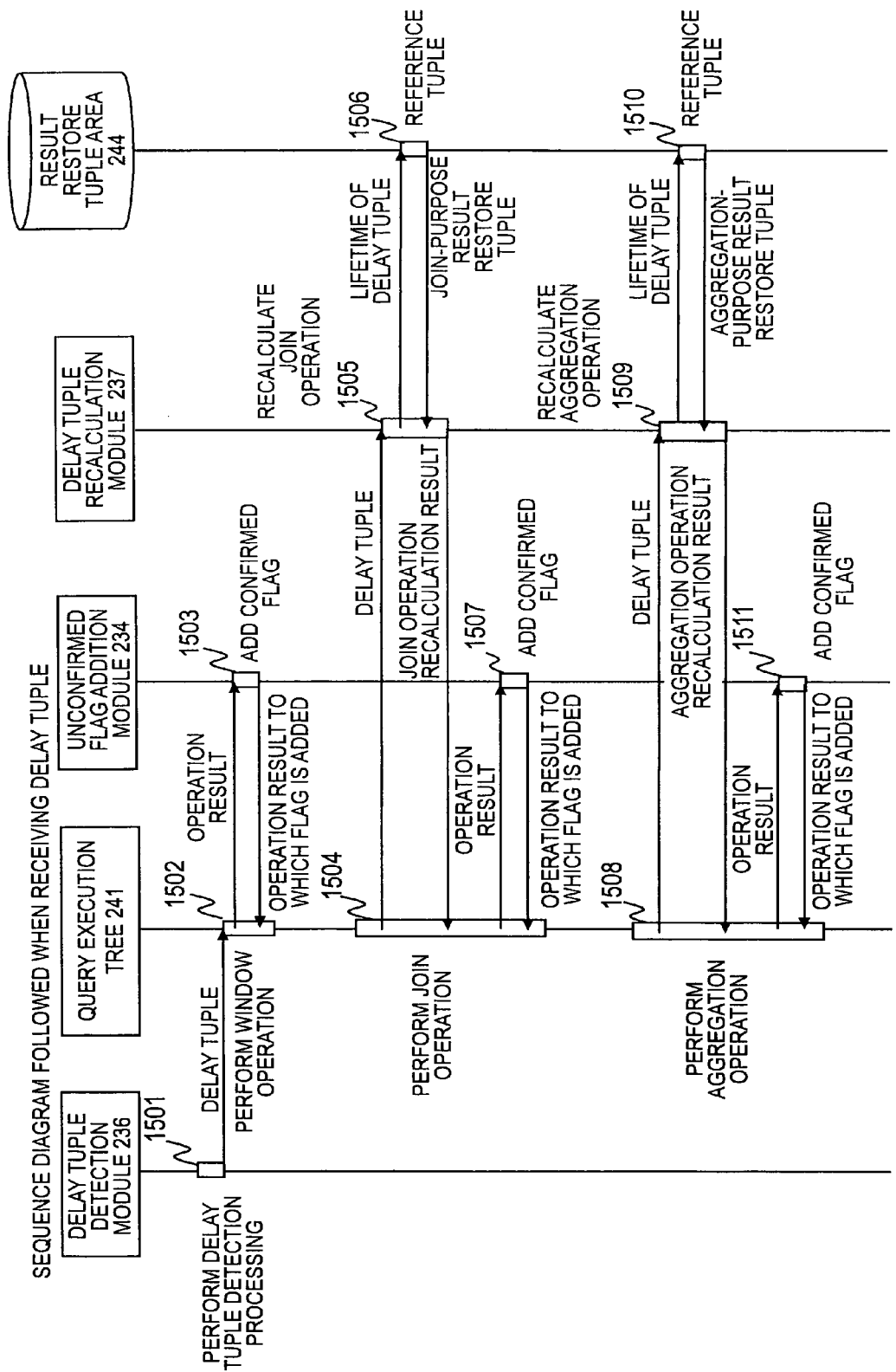
FIG. 23 is a sequence diagram followed when receiving the delay tuple.

FIG. 23 is a sequence diagram followed when receiving the delay tuple.

First, the delay tuple detection module 236 shown in FIG. 2 detects the delay tuple 203 from the received stream data 201 (Processing 1501). Then, the delay tuple detection module 236 transmits the delay tuple 203 to the query execution tree 241 shown in FIG. 2, and the query execution tree 241 performs the window operation (Processing 1502). Then, the query execution tree 241 transmits the operation result obtained by the operation performed in Processing 1502 to the unconfirmed flag addition module 234 shown in FIG. 2, and the unconfirmed flag addition module 234 adds the confirmed flag thereto (Processing 1503). Then, the unconfirmed flag addition module 234 transmits the operation result to which the flag is added to the query execution tree 241. However, in a case other than the case of the row window, the normal window processing is performed, and hence Processing 1503 is not performed.

Subsequently, the query execution tree 241 performs the above-mentioned join operation (Processing 1504). First, the query execution tree 241 transmits the delay tuple 203 to the delay tuple recalculation module 237 shown in FIG. 2. The delay tuple recalculation module 237 performs a recalculation of the join operation from the delay tuple 203 (Processing 1505), and transmits the lifetime of the delay tuple to the result restore tuple area 244 shown in FIG. 2. The result restore tuple area 244 has the tuple satisfying the lifetime referenced therein (Processing 1506), and has the join-purpose result restore tuple transmitted to the delay tuple recalculation module 237. The delay tuple recalculation module 237 recalculates the join operation based on the transmitted join-purpose result restore tuple, and transmits a join operation recalculation result to the query execution tree 241. The query execution tree 241 transmits the recalculated operation result to the unconfirmed flag addition module 234. The unconfirmed flag addition module 234 adds the confirmed flag to the recalculated operation result (Processing 1507), and transmits the operation result to which the flag is added to the query execution tree 241.

Subsequently, the query execution tree 241 performs the above-mentioned aggregation operation (Processing 1508). First, the query execution tree 241 transmits the delay tuple 203 to the delay tuple recalculation module 237. The delay tuple recalculation module 237 performs a recalculation of the aggregation operation (Processing 1509). The delay tuple recalculation module 237 transmits the lifetime of the delay tuple 203 to the result restore tuple area 244, and the result restore tuple area 244 has the tuple satisfying the lifetime referenced therein (Processing 1510), and has the aggregation-purpose result restore tuple transmitted to the delay tuple recalculation module 237. The delay tuple recalculation module 237 recalculates the aggregation operation based on the transmitted aggregation-purpose result restore tuple, and transmits an aggregation operation recalculation result to the query execution tree 241. The query execution tree 241 transmits the operation result to the unconfirmed flag addition module 234. The unconfirmed flag addition module 234 adds the confirmed flag to the operation result (Processing 1511), and transmits the operation result to which the flag is added to the query execution tree 241, which brings the procedure to an end.

According to the above-mentioned procedure, based on the delay tuple 203, the query execution module 230 and the query execution area 240 execute the window operation, the join operation, and the aggregation operation.

Conclusion of the First Embodiment

In the above embodiment, the description has been made on the row window operators 802 and 803, the join operator 806, and the aggregation operator 807. However, an operator other than the row window operator, the join operator, or the aggregation operator may perform the processing of outputting the processing result excluding the delay tuple 203 along with the unconfirmed flag while retaining the midway processing result necessary for a reproduction along with the lifetime, or the processing of calculating the correct processing result from the midway processing result and the delay tuple.

The above description is concluded as follows. That is, in the stream data processing method of processing the stream data 201 whose lifetime is defined by the window, based on the delay processing HBT 202, the operation result excluding the delay tuple 203 along with the unconfirmed flag is output in real time while the midway processing result necessary for a reproduction after the arrival of the delay tuple 203 is retained along with the lifetime, and when the delay tuple arrives, the correct processing result is calculated from the delay tuple and the processing result restore tuple. The above-mentioned processing allows the processing result to be output in real time by using the application timestamp even if the tuple constituting a first object of this invention exists. Further, it is possible to recalculate the processing result when the tuple constituting a second object of this invention arrives, to thereby obtain the correct processing result.

Further, as described above, the processing according to this invention, only in the case where the delay tuple 203 exists, the processing result restore tuple may be retained, which can reduce a necessary memory amount. Further, the processing can be performed by using the processing result restore tuple, thereby making it possible to reduce a time for a recalculation after the arrival of the delay tuple 203.

The first embodiment of this invention has been described above.

This invention is not limited to the first embodiment described above, and various kinds of modifications can be made within the scope of the gist of this invention. As described hereinbelow, the same or further effects can be obtained by embodiments different from the first embodiment, or further effects can be obtained by combining the embodiments with the first embodiment.

It should be noted that in the above embodiment, the significant information that can be understood by the user, into which the measurement value output from the sensor node (temperature sensor node 101 or humidity sensor node 102) is converted is set as the information obtained by converting the binary value output from the sensor node into the value to which a predetermined system of units is added, but this invention is not limited thereto. For example, the significant information may be set as a time-series aggregation value of values output from the sensor node, and an aggregation value of values output from a plurality of sensor nodes. Alternatively, in a case where the sensor node transmits the temperature information every 1 minute, if the user wishes to know the temperature average for the last 1 hour (time-series aggregation), the significant information is set as the temperature average for the last 1 hour. Further, in the example of the aggregation value of values output from a plurality of sensor nodes, the significant information may be set as the highest temperature among the plurality of sensor nodes existing in the same room.

Second Embodiment

Hereinafter, description will be made of a second embodiment of this invention.

In the first embodiment, as shown in FIG. 1, the delay processing HBT 202 and the delay processing dissolution HBT 204 are input from the sensor base station 108, the cradle 109, the RFID reader 110, the cellular phone base station 111, or the relay computer 113, which are shown in FIG. 1, via the network 112 to the stream data processing system 100. However, the second embodiment is characterized in that the stream data processing system 100 generates the delay processing HBT 202 and the delay processing dissolution HBT 204. The second embodiment is provided with the same components and the same processings as the first embodiment except the processing of generating the delay processing HBT 202 and the delay processing dissolution HBT 204.

In this embodiment, the system timestamp, which indicates a system time instant of the stream data processing system 100, is compared with the application timestamp column 301 or 311, and if a predetermined period has elapsed since the value of the application timestamp column 301 or 311 of a tuple that has previously arrived, the delay processing HBT 202 is automatically generated. Further, after generation of the delay processing HBT 202, if a difference between the value of the application timestamp column 301 or 311 at which the delay tuple 203 arrives and the system timestamp is within the predetermined period, the delay processing dissolution HBT 204 is automatically generated. Here, even if the delay processing HBT 202 is generated, the data source cannot distinguish whether or not the stream data 201 is not being generated or whether or not the delay is occurring in the stream data 201.

Figure 24:
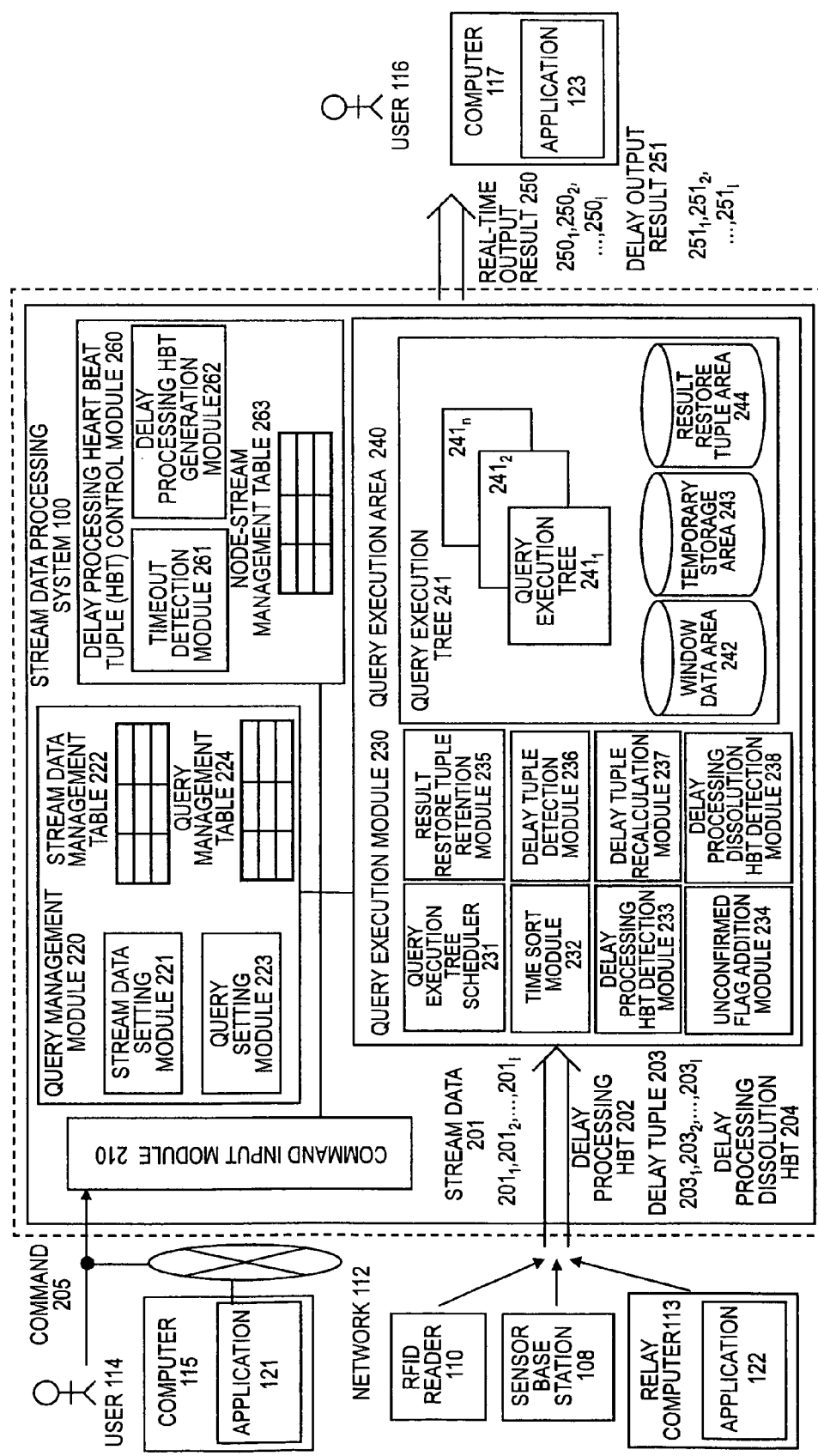
FIG. 24 is a block diagram showing a configuration of the stream data processing system 100 to which the second embodiment of this invention is applied and the system components related thereto.

FIG. 24 is a block diagram showing a configuration of the stream data processing system 100 to which the second embodiment of this invention is applied and the system components related thereto.

In FIG. 24, a delay processing heart beat tuple (HBT) control module 260 for managing or generating the delay processing HBT 202 and the delay processing dissolution HBT 204 is added to the block diagram of FIG. 2 showing the stream data processing system 100 and the system components related thereto.

The delay processing HBT control module 260 includes a timeout detection module 261 for monitoring the stream data 201 and detecting a timeout, a delay processing HBT generation module 262 for generating the delay processing HBT 202 and the delay processing dissolution HBT 204 based on a content detected by the timeout detection module 261, and a node-stream management table 263 for managing a relationship between the stream data 201 and each node of the sensor base station 108, the cradle 109, the RFID reader 110, the cellular phone base station 111, and the relay computer 113.

Figure 25:
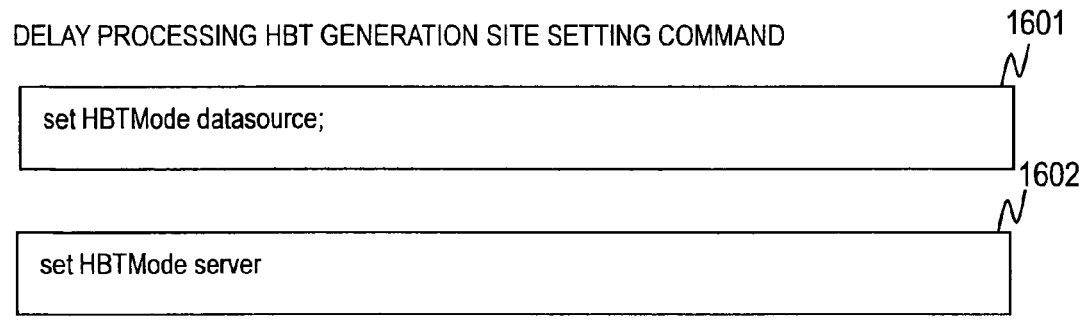
FIG. 25 is an explanatory diagram showing description examples of a preferable command for causing the command input module 210 to set whether or not the stream data processing system 100 is to generate the delay processing HBT 202 and the delay processing dissolution HBT 204.

FIG. 25 is an explanatory diagram showing description examples of a preferable command for causing the command input module 210 to set whether or not the stream data processing system 100 is to generate the delay processing HBT 202 and the delay processing dissolution HBT 204.

A delay processing HBT generation site setting command 1601 is registered in the stream data setting module 221 by the application 121 running on the client computer 115 that is operated by the user 114 via the command input module 210. The delay processing HBT generation site setting command 1601 indicates the description example of a command for causing the delay processing HBT 202 and the delay processing dissolution HBT 204 to be input from the sensor base station 108, the cradle 109, the RFID reader 110, the cellular phone base station 111, or the relay computer 113, which are shown in FIG. 1, via the network 112 to the stream data processing system 100, which has been described in the first embodiment of this invention.

A delay processing HBT generation site setting command 1602 is registered in the stream data setting module 221 by the application 121 running on the client computer 115 that is operated by the user 114 via the command input module 210. The delay processing HBT generation site setting command 1602 indicates the description example of a command for causing the stream data processing system 100 to generate the delay processing HBT 202 and the delay processing dissolution HBT 204.

Figure 26:
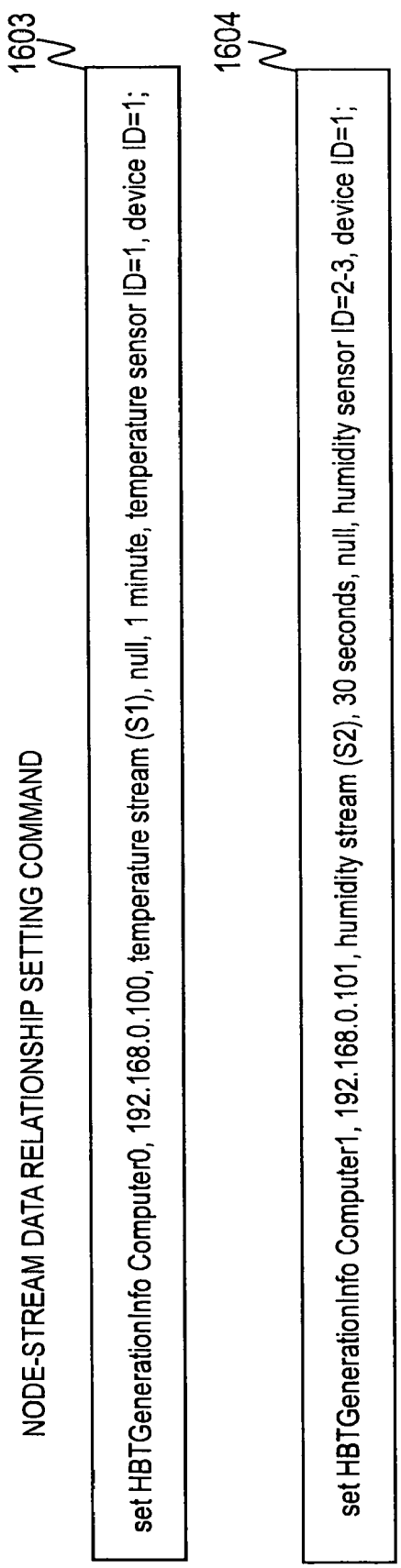
FIG. 26 is an explanatory diagram showing description examples of a preferable command for causing the command input module 210 to set the relationship between node information and stream data information.

FIG. 26 is an explanatory diagram showing description examples of a preferable command for causing the command input module 210 to set the relationship between node information and stream data information when the stream data processing system 100 generates the delay processing HBT 202.

Node-stream data relationship setting commands 1603 and 1604 are registered in the stream data setting module 221 by the application 121 running on the client computer 115 that is operated by the user 114 via the command input module 210. The node-stream data relationship setting command 1603 indicates the description example of a command for setting a node name to "Computer0", a node IP address to "192.168.0.100", a stream data name to "temperature stream (S1)", a timeout setting to "null", a constant interval transmission to "1 minute", and a schema restriction condition to "temperature sensor ID=1, device ID=1". Each setting parameter will be described in detail by using FIG. 27.

The node-stream data relationship setting command 1604 indicates the description example of a command for setting the node name to "Computer1", the node IP address to "192.168.0.101", the stream data name to "humidity stream (S2)", the timeout setting to "30 seconds", the constant interval transmission to "null", and the schema restriction condition to "humidity sensor ID=2-3, device ID=1".

FIG. 27 is a diagram showing an example of a structure of the node-stream management table 263.

The node-stream management table 263 includes a node name column 1701, a node IP address column 1702, and a stream data name column 1703 in which the node name, the node IP address, and the stream data name, which are registered in the command input module 210 by the node-stream data relationship setting commands 1603 and 1604 shown in FIG. 26 and the like, are stored.

Set in a timeout setting column 1704 is a timeout value used when the delay processing HBT 202 is generated. If the stream data 201 does not arrive within the timeout value, the delay processing HBT 202 is generated. A constant interval transmission column 1705 is set in a case where the stream data 201 is generated at constant intervals. If the stream data 201 does not arrive within the constant interval, the delay processing HBT 202 is generated. Set in the timeout setting column 1704 and the constant interval transmission column 1705 are the values registered in the command input module 210 by the node-stream data relationship setting commands 1603 and 1604 and the like.

A schema restriction condition column 1706 is set in a case where information on the stream data 201 transmitted from the sensor node is partially known. Set in the schema restriction condition column 1706 is the value registered in the command input module 210 by the node-stream data relationship setting commands 1603 and 1604 and the like.

For example, a row 1707 shows a case where the stream registration command 1603 shown in FIG. 26 is registered in the node-stream management table 263.

The row 1707 indicates that the node name column 1701 has a value of "Computer0", the node IP address column 1702 has a value of "192.168.0.100", the stream data name column 1703 has a value of "temperature stream (S1)", the timeout setting column 1704 has a value of "–" (null), the constant interval transmission column 1705 has a value of "1 minute", and the schema restriction condition column 1706 has a value of "temperature sensor ID=1, device ID=1".

Figure 28:
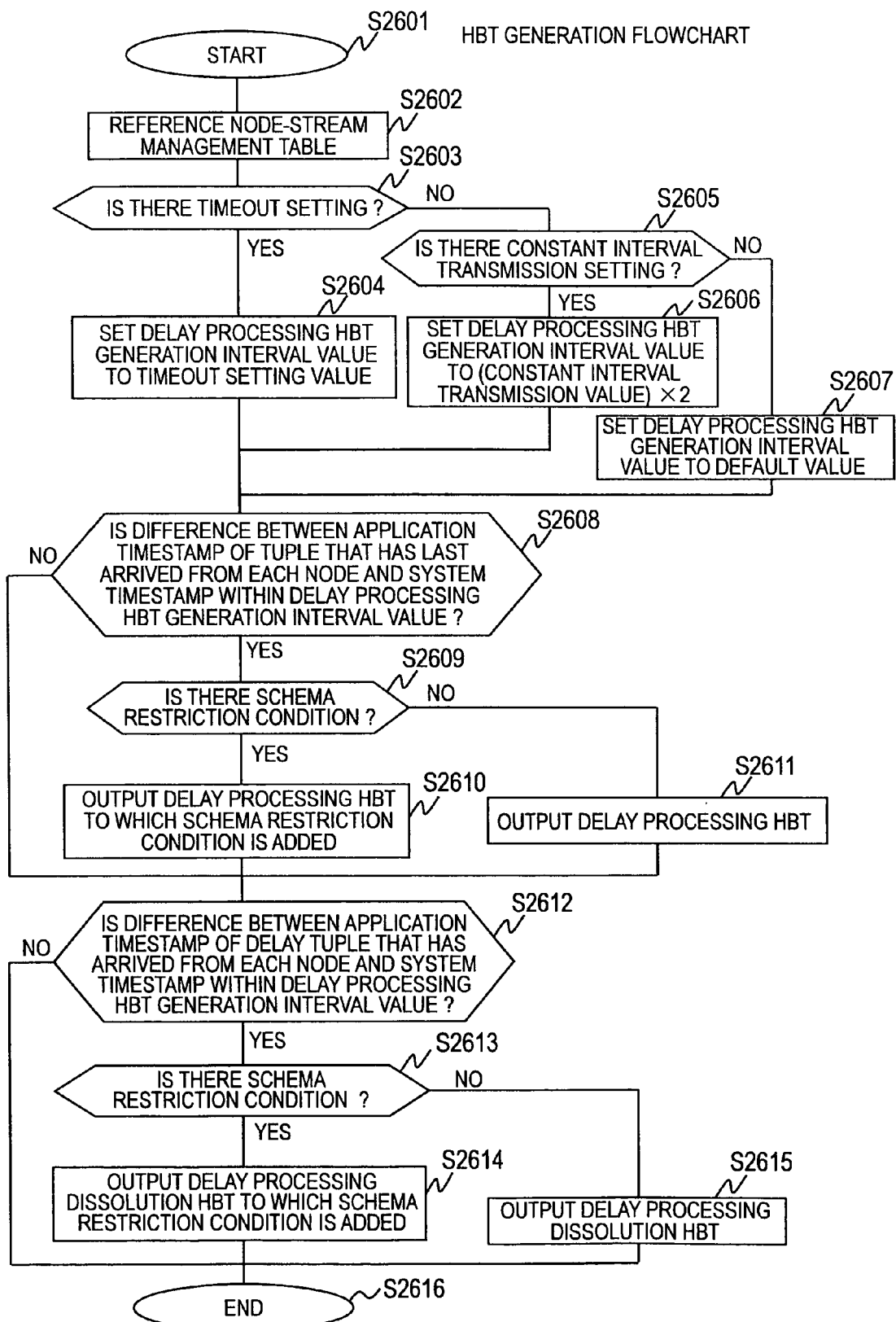
FIG. 28 is a flowchart showing the processing of generating the delay processing HBT 202 and the delay processing dissolution HBT 204.

FIG. 28 is a flowchart showing the processing of generating the delay processing HBT 202 and the delay processing dissolution HBT 204.

First, the node-stream management table 263 shown in FIG. 24 is referenced (S2602), and it is determined whether or not a value is set in the timeout setting column 1704 of the node-stream management table 263 shown in FIG. 27 (S2603). If "YES" is determined in Step S2603, a delay processing HBT generation interval value is set to the timeout setting value (S2604).

If "NO" is determined in Step S2603, it is determined whether or not a value is set in the constant interval transmission column 1705 of the node-stream management table 263 shown in FIG. 27 (S2605). If "YES" is determined in Step S2605, the delay processing HBT generation interval value is set to twice as large as the constant interval transmission value (S2606). If "NO" is determined in Step S2603, the delay processing HBT generation interval value is set to a default value (1 minute or the like) (S2607).

If Step S2604, S2606, or S2607 ends, it is determined whether or not a difference between the value of the application timestamp column 301 of the tuple that has last arrived from each node and the system timestamp is within the delay processing HBT generation interval value (S2608). If "YES" is determined in Step S2608, it is determined whether or not a value is set in the schema restriction condition column 1706 of the node-stream management table 263 shown in FIG. 27 (S2609). If "YES" is determined in Step S2609, the delay processing HBT 202 to which the schema restriction condition is added is output (S2610). If "NO" is determined in Step S2609, the delay processing HBT 202 is output (S2611).

If "NO" is determined in Step S2608, or if Step S2610 or S2611 ends, it is determined whether or not a difference between the value of the application timestamp column 301 of the delay tuple 203 that has arrived from each node and the system timestamp is within the delay processing HBT generation interval value (S2612). If "YES" is determined in Step S2612, it is determined whether or not a value is set in the schema restriction condition column 1706 of the node-stream management table 263 shown in FIG. 27 (S2613). If "YES" is determined in Step S2612, the delay processing dissolution HBT 204 to which the schema restriction condition is added is output (S2614). If "NO" is determined in Step S2613, the delay processing dissolution HBT 204 is output (S2615).

If "NO" is determined in Step S2612, or if Step S2614 or S2615 ends, the processing is brought to an end (S2616).

Specific Example of the Second Embodiment

For example, consideration will be given to a case where the temperature stream data $201_1$ shown in FIG. 6 is input, and the tuples 509, 514, and 519 shown in FIG. 6 collectively arrive at 9:05 (which is an actual time at the stream data processing system 100, and is different from the application timestamp).

In the above-mentioned case, in the flowchart shown in FIG. 28, first, the node-stream management table 263 shown in FIG. 27 is referenced in Step S2602. "NO" is determined in Step S2603, and "YES" is determined in Step S2605, and hence in Step S2606, the delay processing HBT generation interval value is set to twice as large as the constant interval transmission value "1 minute", in other words, "2 minutes".

Then, if the value of the application timestamp column 301 of the arrival tuple that has last arrived from "Computer4" is "9:01" while the system timestamp is "9:03", "YES" is determined in Step S2608.

"YES" is determined in Step S2609, and in Step S2610, the tuple "9:01, 4, HBT" (HBT with the application timestamp set to "9:01" and the temperature sensor ID set to "4") to which the schema restriction condition "temperature sensor ID=4" of the row 1712 is added is input to the temperature stream (S1). This tuple becomes the delay processing HBT 1001 shown in FIG. 17A.

In the case of outputting the delay processing dissolution HBT 204, Step S2606 is executed in the same manner as the above-mentioned processing. Then, "NO" is determined in Step S2608, Step S2612 is executed. From "Computer4", the delay tuples 509, 514, and 519 shown in FIG. 6 arrive at the system timestamp "9:05". Then, in a case of processing the tuple 514 having the value "9:03" in the application timestamp column 301, "YES" is determined in Step S2612.

"YES" is determined in Step S2613, and in Step S2614, the tuple "9:03, 4, HBT" (HBT with the application timestamp column 301 having the value of "9:03" and the temperature sensor ID set to "4") to which the schema restriction condition "temperature sensor ID=4" of the row 1712 is added is input to the temperature stream (S1), which brings the processing to an end.

Here, the application timestamp of this tuple is different from that of the delay processing dissolution HBT 1104 shown in FIG. 19A. However, in the time sort module 232 shown in FIG. 24, the tuples with the application timestamp having the value of "9:03" or later are retained by being sorted in an application timestamp order, and therefore, in the case of this embodiment, the delay tuple 519 is handled as a general tuple.

The second embodiment of this invention has been described above.

Third Embodiment

Hereinafter, description will be made of a third embodiment of this invention.

In the first and second embodiments, the real-time output result 250 and the delay output result 251 shown in FIGS. 2 and 24 are provided to the application 123 running on the computer 117 that is operated by the user 116. However, there may be a case where the delay output result 251 is not necessary in a case of confirming real-time processing results or a case of executing another processing based on the real-time processing results. Even in the above-mentioned case, if the delay tuple 203 is discarded, the values within the window data area 242 and the temporary storage area 243 shown in FIGS. 2 and 24 are different from the case without the delay tuple, and even after processing the delay processing dissolution HBT 204, the real-time output result 250 becomes a result different from the case without the delay tuple 203.

Therefore, the third embodiment is characterized in that output methods for the real-time output result 250 and the delay output result 251 can be switched over. As the output methods, this embodiment shows three methods of (1) outputting all of the processing results, (2) outputting only the real-time output result 250 without outputting the delay output result 251, and executing only the maintenance of the window data area 242 and the temporary storage area 243, and (3) storing correct processing results including the delay output result 251 in an external storage medium (archive) without outputting the delay output result 251.

It should be noted that in addition to the three methods described above, the output methods for the real-time output result 250 and the delay output result 251 may be any combination. Further, in the processing of storing correct processing results including the delay output result 251 in an external storage medium (archive), the correct processing results may be transmitted to another computer or the like other then the external storage medium.

Figure 29:
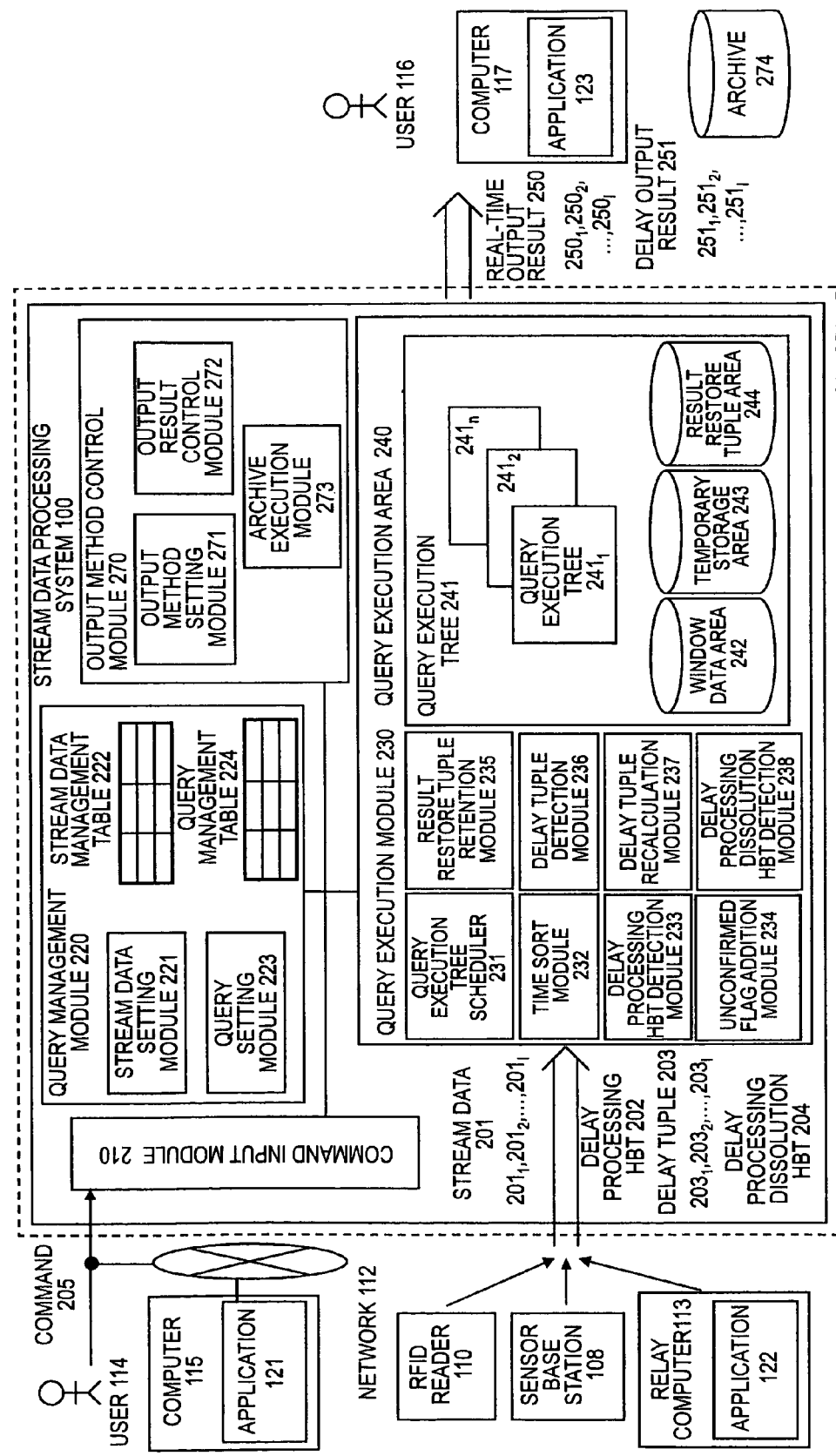
FIG. 29 is a block diagram showing a configuration of the stream data processing system 100 to which the third embodiment of this invention is applied and the system components related thereto.

FIG. 29 is a block diagram showing a configuration of the stream data processing system 100 to which the third embodiment of this invention is applied and the system components related thereto.

In FIG. 29, an output method control module 270 for switching over the output methods for the real-time output result 250 and the delay output result 251 is added to the block diagram of FIG. 2 showing the stream data processing system 100 and the system components related thereto. Further, as the output destination of the operation results, an archive 274 retained in the external storage medium is added to the application 123 running on the computer 117 that is operated by the user 116.

The output method control module 270 includes an output method setting module 271 for receiving an output method setting command input from the command input module 210 shown in FIG. 29, and switching over the output methods, an output result control module 272 for determining whether or not the processing results including the real-time output result 250 and the delay output result 251 are to be output based on the output method set by the output method setting module 271, and an archive execution module 273 for executing an archive with respect to the external storage medium.

Here, the archive 274 may be a file, a database (DB), or any other such means that retains the real-time output result 250 and the delay output result 251.

Figure 30:
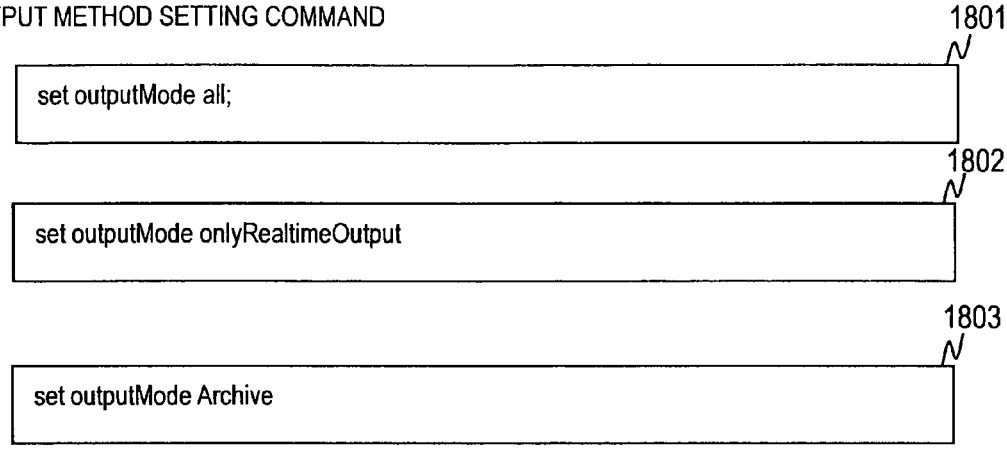
FIG. 30 is an explanatory diagram showing description examples of a preferable command for causing the command input module 210 to set which of the output methods for the real-time output result 250.

FIG. 30 is an explanatory diagram showing description examples of a preferable command for causing the command input module 210 to set which of the output methods for the real-time output result 250 and the delay output result 251 is to be switched over to.

An output method setting command 1801 is registered in the output method setting module 271 by the user 114 or the application 121 running on the client computer 115 via the command input module 210.

The output method setting command 1801 indicates the description example of a command for outputting all of the processing results. An output method setting command 1802 indicates the description example of a command for outputting only the real-time output result 250 without outputting the delay output result 251, and executing only the maintenance of the window data area 242 and the temporary storage area 243. An output method setting command 1803 indicates the description example of a command for storing correct processing results including the delay output result 251 in the external storage medium (archive) without outputting the delay output result 251.

Figure 31:
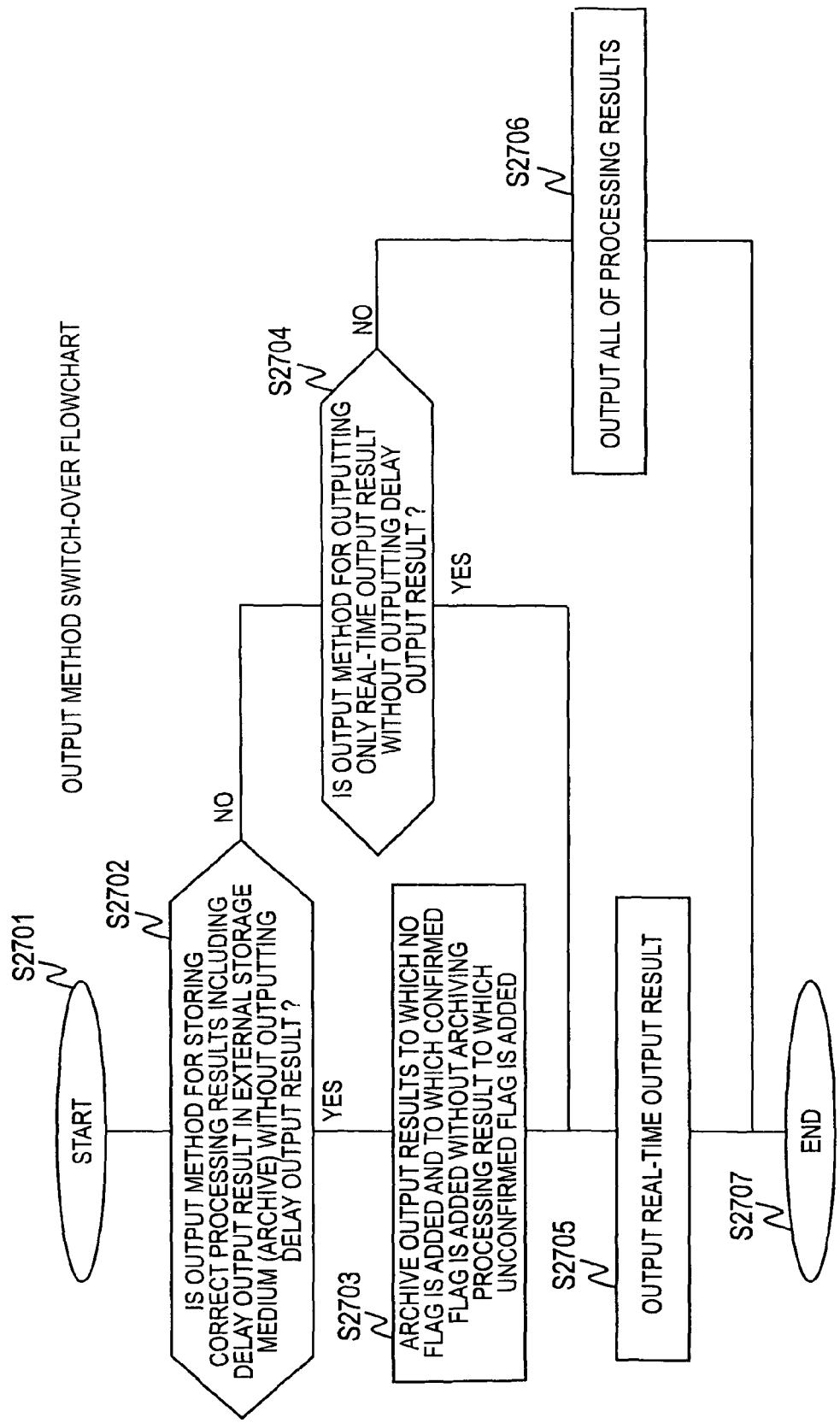
FIG. 31 is a flowchart showing a processing in which the output result control module 272 controls the output results in the case where the output methods are switched over.

FIG. 31 is a flowchart showing a processing in which the output result control module 272 controls the output results in the case where the output methods are switched over.

First, it is determined whether or not the output method is the output method of storing correct processing results including the delay output result 251 in the external storage medium (archive) without outputting the delay output result 251 (S2702). If "YES" is determined in Step S2702, the real-time output result 250 to which no flag is added and the delay output result 251 to which the confirmed flag is added are archived in the external storage medium without archiving the processing result to which the unconfirmed flag is added (S2703). If "NO" is determined in Step S2702, it is determined whether or not the output method is the output method of outputting only the real-time output result 250 without outputting the delay output result 251, and executing only the maintenance of the window data area 242 and the temporary storage area 243 (S2704).

If Step S2703 ends, and if "YES" is determined in Step S2704, only the real-time output result 250 is output (S2705). If "NO" is determined in Step S2704, all of the processing results are output (S2706).

If Step S2705 or S2706 ends, the processing is brought to an end (S2707).

Specific Example of the Third Embodiment

Hereinafter, description will be made of an example case of switching over the output methods for the real-time output result 250 shown in FIG. 20 and the delay output result 251 shown in FIG. 21.

First, in the case where, according to the output method setting command 1801, all of the processing results are output, "NO" is determined in Steps S2702 and S2704, which is followed by execution of Step S2706, in which the tuples 1206 to 1213 and 1306 to 1308 are all output.

Subsequently, in the case where, according to the output method setting command 1802, only the real-time output result 250 is output without outputting the delay output result 251, and if only the maintenance of the window data area 242 and the temporary storage area 243 is executed, "NO" is determined in Step S2702, and "YES" is determined in Step S2704, which is followed by execution of Step S2705, in which the tuples 1206 to 1213 constituting the real-time output result 250 are output.

Subsequently, in the case where, according to the output method setting command 1803, the correct processing results including the delay output result 251 are stored in the external storage medium (archive) without outputting the delay output result 251, "YES" is determined in Step S2702, which is followed by execution of Step S2703. Therefore, the tuples 1206 to 1208, 1210, and 1212 are archived as the real-time output result 250, the tuples 1306 to 1308 are archived as the delay output result 251, and the tuples 1209, 1211, and 1213 to which the unconfirmed flag is added are not archived. Then, Step S2705 is executed, in which the tuples 1206 to 1213 constituting the real-time output result 250 are output.

The third embodiment of this invention has been described above.

Conclusion

This invention is not limited to the first to third embodiments described above, and various kinds of modifications can be made within the scope of the gist of this invention. Further, any combination of the first to third embodiments described above can be made.

For example, in the above embodiments, no limitation is placed on a size of the data to be retained in the result restore tuple area 244 shown in FIGS. 2, 24, and 29. However, if the delay tuple 203 arrives with a delay, there may be a case where a size limit for retaining the data is exceeded. Therefore, by defining a memory upper limit value, an appropriate processing may be performed when the upper limit value is exceeded.

Detailed description thereof will be made hereinbelow.

FIG. 32 is an explanatory diagram showing a description example of a preferable command for causing the command input module 210 to set a memory size upper limit value for the result restore tuple area.

A memory size upper limit value setting command 1901 is registered in the output method setting module 271 by the user 114 or the application 121 running on the client computer 115 via the command input module 210. The memory size upper limit value setting command 1901 indicates the description example of a command for limiting the memory size upper limit value of the result restore tuple area 244 to 300 MB.

If the memory size upper limit value set as in FIG. 32 is exceeded, old timestamp may be deleted from the result restore tuple area 244, the input stream data may be suspended, the input stream data may be processed by having a portion thereof deleted (shredding), or any other such processing may be performed.

Here, FIG. 32 shows the command for setting the memory size, but a size of any storage medium other than the memory may be set.

Further, in the above embodiments, the result restore tuple area 244 retains the temporary storage result processed by the query execution tree 241, but may retain the stream data 201. For example, the result restore tuple area 244 may retain the stream data 201 after the arrival of the delay processing HBT 202 until the arrival of the delay processing dissolution HBT 204.

Further, in the above embodiments, the result restore tuple area 244 is described as being provided within the stream data processing system 100, but may be retained in another computer other than the stream data processing system 100 or the external storage medium.

Further, the above embodiments have been made by taking an example of processing the stream data containing the delay tuple in the stream data processing system, but the stream data containing the delay tuple may be processed in a system such as a database system other than the stream data processing system.

Further, in the above embodiments, the stream data processing system 100 is described as an arbitrary computer system, but a part or all of the processings performed in the stream data processing system 100 may be performed in the storage system.

Further, the above embodiments have been made by taking an example where the sensor base station 108 inputs the temperature data or humidity data to the stream data processing system 100 as the stream data 201, but this invention is not limited thereto. For example, instead of the sensor base station 108, a sensor net server for managing a large number of sensor nodes may output measurement values from the sensor nodes as the stream data 201, and the stream data processing system 100 may convert the measurement values into the real-time output result 250 including the significant information that can be understood by the user 116 and provide the real-time output result 250 to the computer 117. Further, the data input to the stream data processing system 100 may include tag information read by an RFID reader and a data input from the relay computer 113 serving as an RFID middleware system for centrally managing RFIDs. In addition, the data input to the stream data processing system 100 may include traffic information such as obtained from an ETC system, IC card information such as obtained from automatic ticket gates and credit cards, financial information such as information on stock prices, manufacturing process management information, call information, a system log, network access information, traceability individual body information, monitor video metadata, and a Web click stream.

As described above, according to this invention, even if the delay tuple exists in the continuously-changing stream data, it is possible to output the processing result in real time by using the application timestamp, and perform recalculation upon the arrival of the delay tuple to obtain the correct processing result. In particular, this invention can be applied to a financial application, a traffic information system, a traceability system, a sensor monitoring system, computer system management, and the like which handle an enormous amount of stream data necessary to be processed in real time.

While the present invention has been described in detail and pictorially in the accompanying drawings, the present invention is not limited to such detail but covers various obvious modifications and equivalent arrangements, which fall within the purview of the appended claims.

What is claimed is:

1. A stream data processing method for causing a computer to execute a processing of receiving stream data input to the computer as primary information and of generating secondary information by acquiring primary information within a predetermined period from among the received primary information, comprising the steps of:
   receiving the stream data input to the computer as the primary information;
   determining whether or not the received primary information includes delay information indicating that there is primary information to arrive with a delay; and
   performing a first real-time processing when a result of the determination includes delay information, wherein:
   the step of performing the first real-time processing includes the steps of:
      extracting primary information corresponding to a predetermined lifetime from among the received primary information as secondary information, and generating a real-time processing result from the extracted secondary information;
      receiving primary information corresponding to the delay information; and
      recalculating the real-time processing result after receiving the primary information that arrives with a delay;
   the step of generating the real-time processing result from the extracted secondary information includes the steps of:
      obtaining secondary information based on the lifetime from primary information excluding primary information that is to arrive with a delay when the delay information is received, and outputting the secondary information as a real-time output result that needs to be recalculated; and
      retaining result restore information for obtaining the real-time output result as information that needs to be recalculated after receiving the primary information corresponding to the delay information, along with the lifetime; and
   the step of recalculating the real-time processing result after receiving the primary information that arrives with a delay includes the step of recalculating the secondary information from the primary information that arrives with a delay and the result restore information, and outputting a result of the recalculation as a delay output result.

2. The stream data processing method according to claim 1, wherein:
   the step of outputting the secondary information as the real-time output result that needs to be recalculated when the delay information is received includes the step of adding an unconfirmed flag indicating that the recalculation is necessary to the secondary information before the outputting; and
   the step of recalculating the secondary information from the primary information that arrives with a delay and the result restore information, and outputting the result of the recalculation as the delay output result includes the step of adding a confirmed flag indicating that the delay output result represents the result of the recalculation to the delay output result before the outputting.

3. The stream data processing method according to claim 1, further comprising the steps of:
   determining whether or not the received primary information includes delay dissolution information indicating that all of primary information corresponding to the delay information have arrived; and
   performing a second real-time processing when a result of the determination includes the delay dissolution information, wherein:
   the step of performing the second real-time processing includes the step of extracting primary information corresponding to a predetermined lifetime from among the received primary information as secondary information, and generating a real-time processing result from the extracted secondary information; and
   the step of performing the first real-time processing when the result of the determination includes delay information is executed after the delay information is received until the delay dissolution information is received.

4. The stream data processing method according to claim 1, wherein the step of extracting the primary information corresponding to the predetermined lifetime from among the received primary information as the secondary information, and generating the real-time processing result from the extracted secondary information includes the steps of:
   receiving a processing request for acquiring the primary information;
   determining whether or not the processing request includes a request for a processing of executing a window operation in which a data row to be cut out from the primary information is specified and the primary information is converted into secondary information;
   determining whether or not the number of data rows is specified by the processing request if it is determined that the processing request includes the request for the processing of executing the window operation;

adding the unconfirmed flag to the secondary information if it is determined that the number of data rows is specified, and storing the cut-out data rows along with the lifetime in a result restore information area for storing result restore information serving as a midway processing result necessary for the recalculation;

determining, if it is determined that the number of data rows is not specified, whether or not the processing request is made for a partitioned window in which the number of data rows is specified on a group basis and a partition key for classifying the secondary information on a group basis is the same as a key included in the delay information; and adding the unconfirmed flag to the secondary information if it is determined that the processing request is made for the partitioned window and the partition key is the same as the key included in the delay information.

5. The stream data processing method according to claim 2, wherein the step of extracting the primary information corresponding to the predetermined lifetime from among the received primary information as the secondary information, and generating the real-time processing result from the extracted secondary information includes the steps of:

receiving a processing request for acquiring the primary information;

determining whether or not the processing request includes a request for a join operation for generating secondary information by joining a plurality of pieces of the primary information under a predetermined condition;

referencing a temporary storage area for temporarily storing data if it is determined that the processing request includes the request for the join operation, and acquiring join-purpose temporary storage information that has been temporarily stored and is to be joined;

determining whether or not the primary information is to be joined with the join-purpose temporary storage information to which the unconfirmed flag is added;

determining whether or not the primary information is information to which the unconfirmed flag is added;

adding the unconfirmed flag to a join result if it is determined one of that the primary information is to be joined with the join-purpose temporary storage information to which the unconfirmed flag is added and that the primary information is the information to which the unconfirmed flag is added; and storing the join-purpose temporary storage information into a result restore information area as join-purpose result restore information along with the lifetime.

6. The stream data processing method according to claim 5, wherein the step of recalculating the real-time processing result after receiving the primary information that arrives with a delay includes the steps of:

determining whether or not the processing request includes the request for the join operation;

acquiring, if it is determined that the processing request includes the request for the join operation, the join-purpose result restore information having the lifetime corresponding to a timestamp of the primary information that arrives with a delay from the result restore information area;

joining the primary information that arrives with a delay with the join-purpose result restore information to be joined;

adding the confirmed flag indicating that the processing result is confirmed by performing a recalculation on the join result based on the primary information that arrives with a delay before the outputting; and deleting from the result restore information area the result restore information whose lifetime expires earlier than the timestamp of the primary information that arrives with a delay.

7. The stream data processing method according to claim 2, wherein the step of extracting the primary information corresponding to the predetermined lifetime from among the received primary information as the secondary information, and generating the real-time processing result from the extracted secondary information includes the steps of:

receiving a processing request for acquiring the primary information;

determining whether or not the processing request includes a request for executing aggregation processing on the primary information;

referencing a temporary storage area for temporarily storing data if it is determined that the processing request includes the request for the aggregation processing, and acquiring aggregation-purpose temporary storage information to be aggregated;

determining whether or not the aggregation-purpose temporary storage information is information to which the unconfirmed flag is added;

determining whether or not the primary information is information to which the unconfirmed flag is added;

adding the unconfirmed flag to a aggregation result if it is determined one of that the aggregation-purpose temporary storage information is the information to which the unconfirmed flag is added and that the primary information is information to which the unconfirmed flag is added; and storing the aggregation-purpose temporary storage information into a result restore information area for storing result restore information serving as a midway processing result necessary for the recalculation as aggregation-purpose result restore information along with the lifetime.

8. The stream data processing method according to claim 7, wherein the step of recalculating the real-time processing result after receiving the primary information that arrives with a delay includes the steps of:

determining whether or not the processing request includes an aggregation operator;

referencing the result restore information area if it is determined that the processing request includes the aggregation operator, and acquiring the aggregation-purpose result restore information whose lifetime corresponds to the timestamp of the primary information that arrives with a delay;

recalculating the aggregation result from the primary information that arrives with a delay and the aggregation-purpose result restore information to be aggregated;

adding the confirmed flag indicating that the processing result is confirmed by performing the recalculation on the aggregation result based on the primary information that arrives with a delay before the outputting; and deleting from the result restore information area the result restore information whose lifetime expires earlier than the timestamp of the primary information that arrives with a delay.

9. The stream data processing method according to claim 1, further comprising the steps of:

acquiring a system time of the computer;

acquiring a timestamp of stream data that is transmitted last by a node that has transmitted the input stream data, as application time information;

determining, in comparison between the application time information and the system time, whether or not a difference therebetween is within a delay information generation threshold value that is time information preset for detecting a timeout of the stream data; and generating delay information if it is determined that the difference between the application time information and the system time exceeds the delay information generation threshold value, wherein the step of determining whether or not the received primary information includes the delay information indicating that there is the primary information to arrive with a delay includes setting the generated delay information as an input.

10. The stream data processing method according to claim 9, wherein the step of generating the delay information includes the steps of:

determining, in information stored in a node stream management table for managing a relationship between each node that transmits the primary information and the primary information, whether or not information on the stream data transmitted from the node is included in a preset schema restriction condition; and adding the schema restriction condition to the delay information if it is determined that the information on the stream data transmitted from the node is included in the schema restriction condition.

11. The stream data processing method according to claim 1, further comprising deciding by a preset selection one of to output both of the real-time processing result and the delay output result from the computer to another computer operated by a user and to output only the real-time processing result without outputting the delay output result.

12. The stream data processing method according to claim 1, further comprising the step of deciding by a preset selection whether or not a correct processing result including the delay output result is to be stored into an external storage medium, wherein if the correct processing result including the delay output result is to be stored into the external storage medium, without storing a real-time output result that needs to be recalculated into the external storage medium, a real-time output result that has been generated from primary information that does not include the delay information and a real-time output result that has been recalculated based on the primary information that arrives with a delay is stored into the external storage medium.

13. The stream data processing method according to claim 1, wherein if a data size for retaining result restore information necessary for the recalculation along with the lifetime exceeds a preset memory size upper limit value, a procedure for one of deleting data having an old timestamp from among the result restore information, temporarily suspending inputting of the stream data, and processing the stream data by deleting a portion thereof is executed.

14. A computer system, which is provided with a processor, a storage system, and an interface and set in the storage system, and in which stream data input through the interface is acquired as primary information, and secondary information is generated for the acquired primary information based on a window for defining a lifetime during which the primary information is to be processed, the computer system comprising:

a first processing module for outputting, as a real-time processing result, a processing result excluding primary information that arrives with a delay based on delay information indicating that a portion of the primary information arrives with a delay;

a result restore information retention module for retaining, along with the lifetime, result restore information necessary for a recalculation performed when primary information corresponding to the delay information arrives; and a delay tuple recalculation module for recalculating, when the primary information corresponding to the delay information arrives, the secondary information from the result restore information and the primary information corresponding to the delay information, and outputting a result of the recalculation as a delay output result.

15. The computer system according to claim 14, further comprising:

a timeout detection module for acquiring a timestamp of stream data that is transmitted last by a node that has transmitted the input stream data, as application time information, and determining, in comparison between the application time information and a system time of the computer, whether or not a difference therebetween is within a delay information generation threshold value that is time information preset for detecting a timeout of the stream data; and a delay processing heartbeat tuple generation module for generating the delay information if the timeout detection module determines that the difference exceeds the delay information generation threshold value.

16. The computer system according to claim 14, wherein:

the first processing module adds an unconfirmed flag indicating that the real-time processing result includes secondary information that needs to be recalculated to the real-time processing result; and the delay tuple recalculation module adds a confirmed flag indicating that the delay output result represents the result of the recalculation to the delay output result.

17. The computer system according to claim 16, further comprising:

an output method setting module for setting, with respect to the real-time output result and the delay output result, whether or not a correct processing result including the delay output result is stored into an external storage medium without outputting the delay output result as a result to be output;

an archive execution module for storing, if the correct processing result including the delay output result is stored into the external storage medium without outputting the delay output result as the result to be output, a processing result to which the confirmed flag is added into the external storage medium without storing a processing result to which the unconfirmed flag is added into the external storage medium, the confirmed flag indicating that the processing result is confirmed by recalculating a processing based on primary information to which the unconfirmed flag is not added and which corresponds to the delay information; and an output result control module for outputting only the real-time output result.

18. A machine-readable medium for storing a program for causing a computer to execute a stream data processing of acquiring stream data input to the computer as primary information, and of generating secondary information for the acquired primary information based on a window for defining a lifetime during which the primary information is to be processed, the program executing the computer to execute the procedures of:

extracting, based on delay information indicating that a portion of the primary information arrives with a delay, a processing result excluding primary information that arrives with a delay as the secondary information, and outputting the secondary information as a real-time processing result;

retaining, along with the lifetime, a midway processing result necessary for a recalculation performed when primary information corresponding to the delay information arrives; and recalculating, when the primary information corresponding to the delay information arrives, the secondary information from the midway processing result and the primary information corresponding to the delay information, and outputting a recalculation result as the delay output result.

19. The machine-readable medium for storing the program according to claim 18, wherein:

the procedure of outputting the secondary information as the real-time processing result includes adding an unconfirmed flag indicating that the real-time processing result includes secondary information that needs to be recalculated to the real-time processing result; and the procedure of outputting the recalculation result as the delay output result includes adding a confirmed flag indicating that the delay output result represents the recalculation result to the delay output result.

* * * * *